(12) United States Patent
Jens et al.

(10) Patent No.: US 9,468,152 B1
(45) Date of Patent: Oct. 18, 2016

(54) PLANT PRUNING AND HUSBANDRY

(71) Applicant: Harvest Moon Automation Inc., Winchester, MA (US)

(72) Inventors: Stephen Jens, Winchester, MA (US); Janice Huxley Jens, Winchester, MA (US); Edward Dickinson, Leicester, MA (US)

(73) Assignee: Harvest Moon Automation Inc., Winchester, MA (US)

( * ) Notice: Subject to any disclaimer, the term of this patent is extended or adjusted under 35 U.S.C. 154(b) by 0 days.

(21) Appl. No.: 14/734,435

(22) Filed: Jun. 9, 2015

(51) Int. Cl.
| | |
|---|---|
| A01D 46/00 | (2006.01) |
| A01G 3/08 | (2006.01) |
| G06K 9/00 | (2006.01) |
| G06K 9/62 | (2006.01) |

(52) U.S. Cl.
CPC ............. *A01G 3/08* (2013.01); *A01D 46/00* (2013.01); *G06K 9/00657* (2013.01); *G06K 9/6202* (2013.01)

(58) Field of Classification Search
CPC ............................... A01G 3/08; A01D 46/00
USPC ............................................ 701/50; 56/10.1
See application file for complete search history.

(56) References Cited

U.S. PATENT DOCUMENTS

| | | |
|---|---|---|
| 117,705 A | 8/1871 | Warren et al. |
| 218,795 A | 8/1879 | Thompson |
| 811,978 A | 2/1906 | Weigen |
| 2,544,023 A | 3/1951 | Johnson |
| 2,583,571 A | 1/1952 | Howe |
| 2,825,273 A | 3/1958 | Faucheux |
| 4,519,193 A | 5/1985 | Yoshida |
| 4,532,757 A | 8/1985 | Tutle |

(Continued)

FOREIGN PATENT DOCUMENTS

| | | |
|---|---|---|
| EP | 267860 A3 | 4/1990 |
| EP | 1002460 B1 | 4/2003 |

(Continued)

OTHER PUBLICATIONS

Authorized Officer E. Eskina, International Search and Written Opinion for International Application No. PCT/US2016/018859, dated May 12, 2016, 8 pages.

(Continued)

*Primary Examiner* — John Q Nguyen
*Assistant Examiner* — Nadeem Odeh
(74) *Attorney, Agent, or Firm* — Fish & Richardson P.C.

(57) ABSTRACT

A method of pruning plants includes generating a first series of images of a plant, identifying a first object displayed in the images as a fruit of the plant, collecting data associated with a state of the fruit, identifying a second object displayed in the images as a suspect plant component of the plant, comparing a parameter of the suspect plant component to a reference parameter associated with plant components to be pruned, in response to determining that the parameter of the suspect plant component sufficiently matches the reference parameter, identifying the suspect plant component as a plant component to be pruned from the plant, advancing an automated pruner toward the plant component, operating the automated pruner to sever the plant component from the plant, and while the automated pruner is operated to sever the plant component, generating a second series of images of one or more additional plants.

20 Claims, 11 Drawing Sheets
(3 of 11 Drawing Sheet(s) Filed in Color)

(56) References Cited

U.S. PATENT DOCUMENTS

| | | |
|---|---|---|
| 4,843,561 A | 6/1989 | Larson |
| 4,873,644 A | 10/1989 | Fujii et al. |
| 4,975,016 A | 12/1990 | Pellenc et al. |
| 5,054,232 A | 10/1991 | Rhode |
| 5,544,474 A | 8/1996 | Finkelstein |
| 6,919,959 B2 | 7/2005 | Masten |
| 7,215,420 B2 | 5/2007 | Gellerman et al. |
| 7,725,233 B2 | 5/2010 | Hendrickson et al. |
| 7,765,780 B2 | 8/2010 | Koselka et al. |
| 8,272,200 B1 | 9/2012 | Ottaway |
| 8,381,501 B2 | 2/2013 | Koselka et al. |
| 8,452,501 B1 | 5/2013 | Lange et al. |
| 8,642,910 B2 | 2/2014 | Pellenc et al. |
| 8,841,570 B2 | 9/2014 | Vasilescu |
| 8,855,412 B2 | 10/2014 | Quan et al. |
| 9,282,688 B2 | 3/2016 | Casper et al. |
| 2002/0022929 A1 | 2/2002 | Ell |
| 2002/0024665 A1 | 2/2002 | Masten |
| 2008/0110026 A1 | 5/2008 | Marcoe |
| 2009/0293442 A1 | 12/2009 | Chang et al. |
| 2011/0022231 A1 | 1/2011 | Walker |
| 2011/0046785 A1* | 2/2011 | Zeelen .................. A01D 46/30 700/259 |
| 2011/0047951 A1 | 3/2011 | Moore |
| 2011/0211733 A1 | 9/2011 | Schwarz |
| 2012/0096823 A1 | 4/2012 | Moore |
| 2013/0204437 A1 | 8/2013 | Koselka |
| 2013/0325346 A1 | 12/2013 | McPeek et al. |
| 2014/0168412 A1 | 6/2014 | Shulman et al. |
| 2014/0260148 A1 | 9/2014 | Jens |
| 2014/0314280 A1 | 10/2014 | Lee |
| 2015/0027040 A1 | 1/2015 | Redden |
| 2016/0078304 A1 | 3/2016 | Bremer et al. |

FOREIGN PATENT DOCUMENTS

| | | |
|---|---|---|
| JP | 03506779 B2 | 3/2004 |
| JP | 2009027977 A | 2/2009 |
| SU | 1045848 A1 | 10/1983 |
| SU | 1289412 A1 | 2/1987 |
| WO | WO9625842 A1 | 8/1996 |
| WO | WO9853961 A1 | 12/1998 |
| WO | WO2005092077 A3 | 3/2006 |
| WO | WO2007088225 A1 | 8/2007 |
| WO | WO2008037035 A1 | 4/2008 |
| WO | WO2006063314 A3 | 4/2009 |
| WO | WO2010063075 A1 | 6/2010 |
| WO | WO2011041924 A1 | 4/2011 |
| WO | WO2015121809 A1 | 8/2015 |

OTHER PUBLICATIONS

Authorized Officer Arnaud Benedetti, International Search and Written Opinion for International Application No. PCT/ US2016/ 028631, dated Jul. 13, 2016, 13 pages.

* cited by examiner

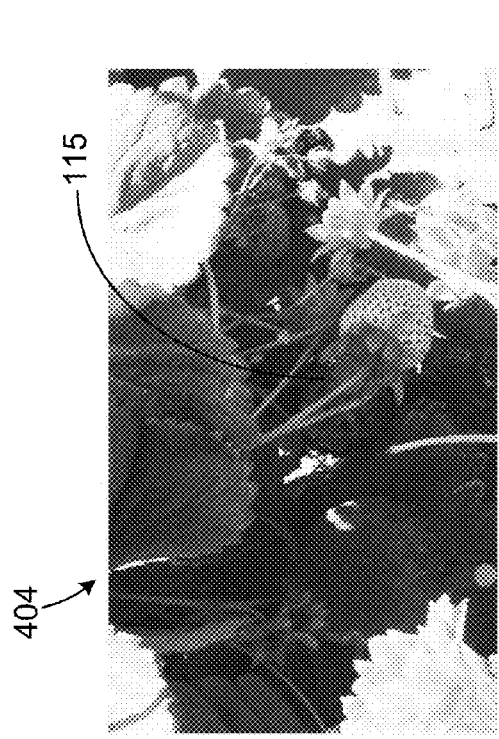
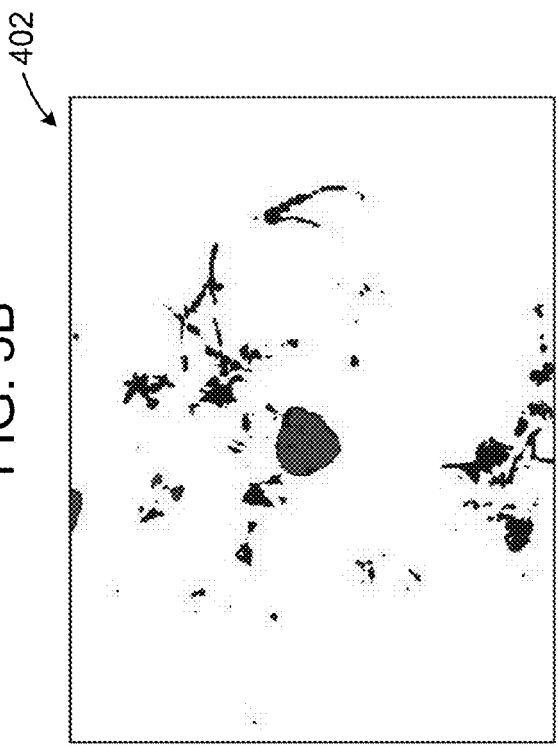
FIG. 5A
FIG. 5B
FIG. 5C

PLANT PRUNING AND HUSBANDRY

TECHNICAL FIELD

This invention relates to growing fruit-bearing plants, and more particularly to pruning plants and managing associated crops.

BACKGROUND

Managing plant production involves performing activities (e.g., pruning and harvesting) that promote an optimal growth pattern and a maximum yield of plants. Pruning plants (e.g., fruit plants, vegetable plants, and floral plants) includes visually examining the plants, determining which parts (e.g., branches, stems, vines, buds, or roots) of the plants need to be removed in order to improve one or both of a growth and a health of the plants, and subsequently removing the selected parts from the plants. Criteria for determining whether a plant component needs to be removed may be based on one or more criteria including a growth level and a health state of one or more components of the plant or a field in which the plant is growing. The growth level and the health state may be evaluated for optimizing a yield and a quality of, for example, fruits produced by the plant and for removing diseased, damaged, or dead plant components that may negatively impact the health of the plant. Plant components that are selected for removal may be removed using a pruning apparatus (e.g., an automated or semi-automated pruning machine or a hand-held apparatus) or removed directly by hand. During or following a pruning operation, a grower can visually survey the field to determine optimal measures for managing plant production.

SUMMARY

The invention involves a realization that improvements in pruning plants (e.g., strawberries) in an automated manner can increase an efficiency (e.g., a productivity as it relates to a pruning rate) of a pruning operation, thereby reducing a unit cost of pruning a plant. Such pruning of the plants in the automated manner can reduce a total time required to prune a given amount of plants. Data generated from images of the plants can be simultaneously compiled to provide an overall assessment of the field and plant conditions and may be used by a grower to determine one or more of an optimal fertilizing, watering, and harvesting schedule. Example data parameters that may be collected include a ripeness, a size, a location, and a density of the plant components (e.g., a fruit or a runner).

One aspect of the invention features a method of pruning plants. The method includes generating a first series of images of a plant disposed along a planting bed using a camera mounted to a machine moving along the planting bed, identifying a first object displayed in the first series of images as a fruit on or within the plant from first feature boundary data defined by first color regions associated with the images, and collecting data associated with a state of the fruit such that the data can be used to determine a schedule for harvesting fruits from the planting bed. The method further includes identifying a second object displayed in the first series of images as a suspect plant component of the plant from second feature boundary data defined by second color regions associated with the images, comparing a parameter of the suspect plant component to a reference parameter associated with plant components to be pruned from the plant, and in response to determining that the parameter of the suspect plant component sufficiently matches the reference parameter, identifying the suspect plant component as a plant component to be pruned from the plant. The method further includes, upon identifying the suspect plant component as a plant component to be pruned from the plant, advancing an automated pruner mounted to the machine toward the plant component based on a determined position of the plant component, and operating the automated pruner to sever the plant component from the plant as the machine continues to move along the planting bed. The method further includes, while the automated pruner is operated to sever the plant component, generating a second series of images of one or more additional plants disposed along the planting bed using the camera as the machine continues to move along the planting bed.

In some examples, the camera forms a portion of a machine vision system that is operable to analyze the first and second series of images.

In some examples, the automated pruner is located rearward of the machine vision system, such that the camera generates the second series of images of the one or more additional plants while the automated pruner is operated to sever the plant component of the plant.

In some examples, identifying the suspect plant component as a plant component to be removed from the plant includes identifying the suspect plant component as a runner.

In some examples, identifying the first object as a fruit includes identifying the first object as a strawberry.

In some examples, the method further includes identifying the second object as a suspect plant component using a blob analysis.

In some examples, the blob analysis identifies regions of the second object that fall within a color range and determines a border around the regions that define the parameter of the second object.

In some examples, the parameter includes a shape of the second object, and identifying the second object as a suspect plant component includes comparing the shape of the second object to a known shape of the plant component.

In some examples, the parameter is a size of the second object.

In some examples, the predetermined position of the suspect plant component is a two-dimensional location, and the method further includes, before advancing the automated pruner toward the suspect plant component, aligning the automated picker with the two-dimensional location of the suspect plant component.

In some examples, the method further includes monitoring a proximity sensor of the automated pruner to determine that the automated pruner is within a predetermined distance of an impediment, detecting a color of the impediment using a color sensor, and confirming, based on the color of the impediment, that the impediment is a runner.

In some examples, the method further includes drawing the plant component into a suction tube of the automated pruner and severing the plant component from the plant using a cutter of the automated pruner.

In some examples, the cutter is an oscillating cutter that moves about the suction tube or a rotating cutter that sweeps through the suction tube.

In some examples, the method further includes lifting the plant component up from the planting bed by directing air toward the plant component using an air delivery jet.

In some examples, the method further includes moving the plant to expose hidden fruits and other hidden components on or within the plants and one or more additional plants while generating the first and second series of images.

In some examples, the data includes one or more of a ripeness of the fruit, a location of the fruit, a size of the fruit, and a count associated with the fruit.

In some examples, the method further includes generating a field assessment report based on the data.

In some examples, the method further includes collecting additional data associated with the plant component, such that the additional data can be used to determine the schedule for harvesting the fruits from the planting bed.

Another aspect of the invention features a pruning system that includes a machine configured to move along a planting bed and a machine vision system mounted to the machine and configured to generate a first series images of a plant disposed along the planting bed as the machine moves along the planting bed. The pruning system further includes one or more processors configured to identify a first object displayed in the first series of images as a fruit on or within the plant from first feature boundary data defined by first color regions associated with the images, collect data associated with a state of the fruit such that the data can be used to determine a schedule for harvesting fruits from the planting bed, identify a second object displayed in the first series of images as a suspect plant component of the plant from second feature boundary data defined by second color regions associated with the images, compare a parameter of the suspect plant component to a reference parameter associated with plant components to be pruned from the plant, and in response to determining that the parameter of the suspect plant component sufficiently matches the reference parameter, identify the suspect plant component as a plant component to be pruned from the plant. The pruning system further includes an automated pruner operable to sever the plant component from the plant and a controller configured to provide instructions for advancing the automated pruner toward the plant component based on a determined position of the plant component in response to identifying the suspect plant component as a plant component to be pruned from the plant and operating the automated pruner to sever the plant component from the plant as the machine continues to move along the planting bed and while the machine vision system generates a second series of images of one or more additional plants disposed along the planting bed.

Another aspect of the invention features a method of pruning plants. The method includes moving a machine along a bed of plants, the machine having a pruning device including a flexible suction tube extending from a vacuum source to an inlet disposed at an end of the flexible suction tube and associated with a cutting device, while moving the inlet of the flexible suction tube, with the cutting device, and with respect to the vacuum source, such that as the inlet approaches a plant component extending from a plant, the plant component is drawn into the flexible suction tube and is severed by the cutting device.

Another aspect of the invention features a pruning system that includes a frame configured to move along a bed of plants and a pruning device mounted to the frame. The pruning device includes a flexible suction tube configured to draw in a plant component extending from a plant, an inlet disposed at an end of the flexible suction tube and configured to approach the plant component, the flexible suction tube extending from a vacuum source to the inlet, and a cutting device associated with the inlet and configured to sever the plant component as the plant component is drawn into the flexible suction tube.

Various implementations of these concepts may provide one or more advantages, particularly as to pruning speed and/or accuracy. For example, by continuing to generate additional images of additional plants located ahead of the automated pruner while the automated pruner is manipulated to remove runners and while the plants ahead of the automated pruner continue to be moved, the pruning system can achieve an advantageously high pruning rate (e.g., a strawberry runner pruning rate). Moreover, such parallel operations can offer additional time for the image processing system to develop an accurate determination of the location of runners, the location of the fruits, and the ripeness of fruits. Incorporating distance and/or color sensing into the pruning mechanism can further increase the accuracy of the pruning process, and can enable higher mechanism speeds without damaging sensitive fruits.

Implementations of these concepts can further improve the management of field plant production, in that a succinct report providing a field assessment can be generated automatically (e.g., provided as summary data generated from consecutive plant images) while the pruning operation is carried out or upon completion of the pruning operation. As the summary data can be based on consecutive plant images covering substantially an entire area of a field region, the field assessment may provide a more accurate and comprehensive evaluation as compared to a field assessment based on human visual surveillance. The field assessment can be used to predict a potential yield (e.g., as measured according to the quantity, ripeness, and size of fruits produced by the plants) of the field and may be stored for later access.

Implementations of these concepts can also achieve an advantageously high pruning rate and pruning count as compared to conventional systems that prune plants using non-suction mechanisms.

The details of one or more embodiments of the invention are set forth in the accompanying drawings and the description below. Other features, aspects, and advantages of the invention will be apparent from the description, drawings, and claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 5A, 5B, and 5C display a standard image acquired by a camera of the pruning system of FIG. 1, an enhanced image produced by a processor of the camera, and a machine vision view generated by the processor of the camera, respectively.

Like reference symbols in the various figures indicate like elements.

DETAILED DESCRIPTION

Pruning systems for removing plant components from plants are described below. In various examples, the described pruning systems includes pruning assemblies, manipulation devices, machine vision systems, and associated control elements that allow the pruning systems to remove selected plant components from their respective plants in an automated and efficient manner, thereby substantially reducing the time required to remove the selected plant components as compared to the time required to remove the selected plant components using conventional pruners. Plant components that may be removed by the pruning systems include, for example, strawberry runners, grape vines, kiwi vines, and tomato stems. While the pruning systems are particularly suitable to plants growing in beds and sending out runners, vines, or stems that need to be pruned, the systems may be readily adapted to other types of crops, such as peaches, nectarines, figs, olives, walnuts, chestnuts, pecans, almonds, cherries, apples, pears, plums, apricots, and various citrus plants.

Figure 1:
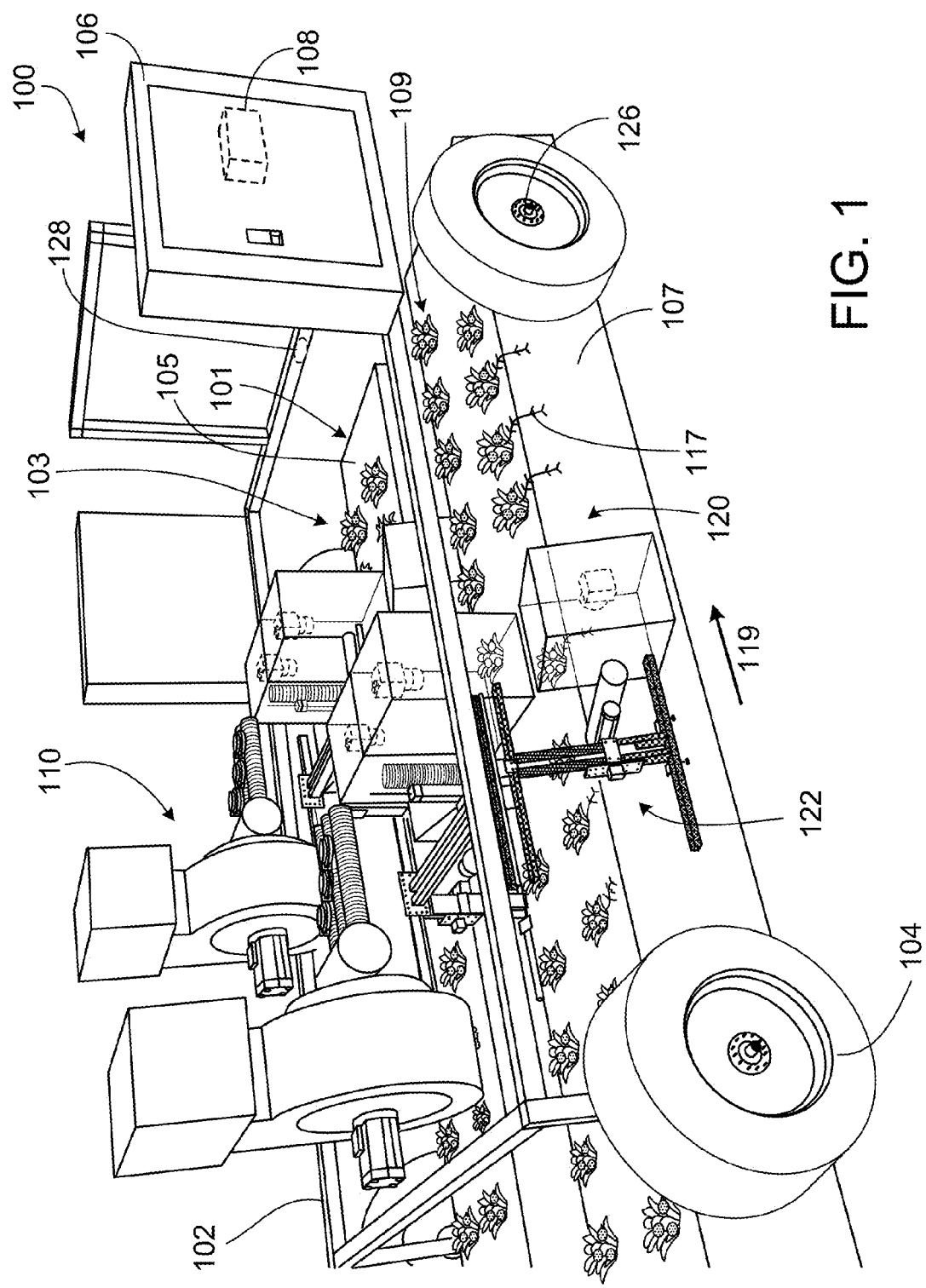
FIG. 1 is a perspective view of a pruning system.

FIG. 1 displays a perspective view of a pruning system 100 that is operable to remove a variety of plant components (e.g., runners) from plants in an automated manner. In some examples, the pruning system 100 may be self-propelled or steered by an operator (e.g., an operator riding atop the pruning system 100, or a remote operator). In some examples, the pruning system 100 may be configured to operate autonomously based on GPS mappings. In some examples, the pruning system 100 is configured to operate with other vehicles, such as a tractor that can pull and guide the pruning system 100 through a field. In such cases, the pruning system 100 may be attached to the tractor via a three-point hitch or any other suitable attachment mechanisms known to a person skilled in the art. For purposes of illustration, only the components of the pruning system 100 that are significant to the description of the pruning operation are shown. However, it will be understood that other standard electrical and mechanical components will be included. For example, the pruning system 100 may include a generator and/or batteries for powering electrical components.

In the example of FIG. 1, the pruning system 100 is positioned over two spaced beds 101 of plants 103 (e.g., strawberry plants) that are located in a field. The beds 101 are elevated with respect to a ground of the field such that each bed 101 has a top surface 105 and two opposing side surfaces 107. As illustrated, the plants 103 are arranged in two spaced seed lines 109 along the top surface 105 of each bed 101. The plants 103 include leaves 113 that extend from petioles 111 and strawberries 115 (shown in FIG. 2) that extend from stems 121 (shown in FIG. 3A). The plants 103 also include runners 117 that extend horizontally along the surfaces 105, 107 of the beds 101 from a single plant 103 or between consecutive plants 103. The runners 117 do not have leaves and can produce daughter strawberry plants at ends of the runners 117. In some examples, some of the runners 117 may hang over the side surfaces 107 of the beds 101.

In the example of FIG. 1 (e.g., where the pruning system 100 is positioned in a field of strawberries 115), the beds 101 have a height of about 20 cm to about 50 cm (e.g., about 38 cm), a top width (as measured along the top surfaces 105 of the beds 101) of about 60 cm to about 90 cm (e.g., about 76 cm), and a base width (as measured along the ground of the field) of about 80 cm to about 110 cm (e.g., about 94 cm). In some examples, the beds 101 are spaced apart (e.g., as measured between respective centerlines of the beds 101) by about 115 cm to about 145 cm (e.g., about 132 cm). In some examples, the seed lines 109 are spaced apart by about 30 cm to about 60 cm (e.g., about 43 cm) along the beds 101. In some examples, the plants 103 arranged along a seed line 109 are spaced apart by about 20 cm to about 50 cm (e.g., about 38 cm). The pruning system 100 is configured to operate on such beds 101 of plants 103.

The pruning system 100 includes a frame 102 supported by four wheels 104 that transport the pruning system 100 in a direction of travel 119, and two electrical enclosures 106 mounted to the frame 102. The pruning system 100 is configured such that during operation the wheels 104 are located along the outer side surfaces 107 of two spaced beds 101 of plants 103. The wheels 104 and suspension support the frame 102 (and any components mounted to the frame 102) of the pruning system 100 at a desired height above the raised bed 101. An operator may steer and monitor the operation of the pruning system 100.

Figure 2:
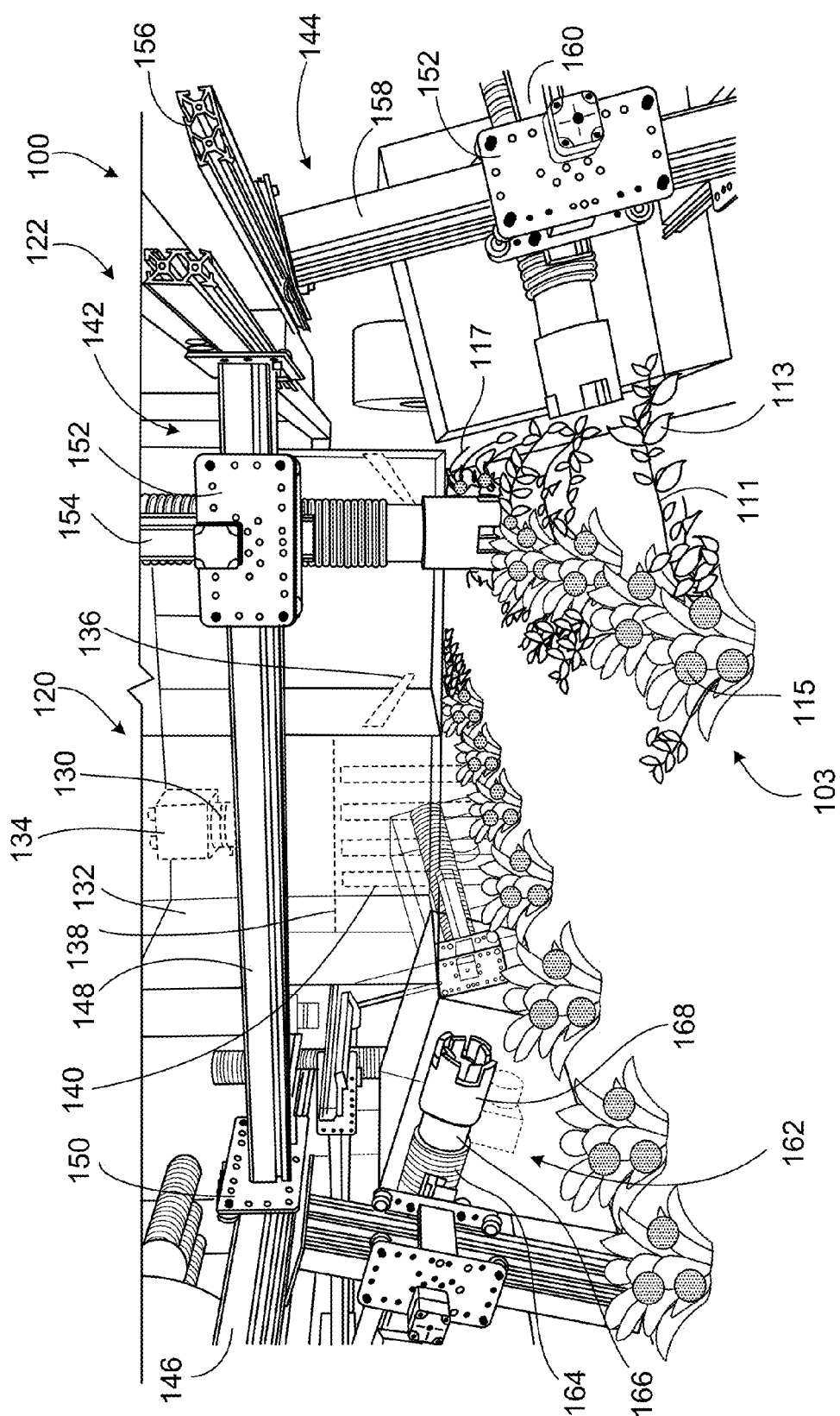
FIG. 2 is a rear perspective view of a portion of the pruning system of FIG. 1.

Referring to FIG. 2, the portion of the pruning system 100 that passes over each bed 101 includes two machine vision systems 120 that image the plants 103 and identify the strawberries 115 and the runners 117 within the plants 103. One machine vision system 120 is located along each bed 101 of plants. The pruning system 100 also includes manipulating devices (e.g., air nozzles 136 and a flexible comb 138) for moving the plants 103 (e.g., the petioles 111 and leaves 113 of the plants 103), and two pruning assemblies 122 that remove identified runners 117 from the plants 103.

Referring back to FIG. 1, the pruning system 100 additionally includes a programmable logic controller (PLC) 108 that is located within one of the electrical enclosures 106 and electrically coupled to the machine vision systems 120, an encoder 126 that is operable to detect an angular velocity of the wheels 104, and an ultrasonic sensor 128 that is operable to detect a distance and maintain a desired distance between the machine vision systems 120 (e.g., cameras 130 of the machine vision systems 120) and the top surfaces 105 of the beds 101. For example, the machine vision systems 120 and the pruning assemblies 122 are supported by frames (e.g., frames that are adjustable via associated actuators and that are moveably attached to the frame 102) that are adjusted automatically in vertical and lateral directions to optimize their positions relative to the beds 101. The encoder 126 is located within a hub of one of the wheels 104, and the ultrasonic sensor 128 is located forward of the machine vision systems 120 along the frame 102 of the pruning system 100. A GPS system (e.g., located within one of the electrical enclosures 106) provides a field location to the PLC 108.

As shown in FIG. 2, each machine vision system 120 includes four cameras 130. One camera 130 is located above each seed line 109, and one camera 130 is located along each side surface 107 of the bed 101. The machine vision system 120 further includes four hoods 132 that respectively surround the cameras 130. The cameras 130 are oriented and positioned to image respective fields of view along the top surface 105 and along the side surfaces 107 of the bed 101 of plants 103. Accordingly, each camera 130 and respective hood 132 is oriented approximately perpendicular to the top surface 105 or a respective side surface 107 of the bed 101 of plants 103. In some examples, the cameras 130 are spaced (as measured from lenses of the cameras 130) from the top surface 105 or a respective side surface 107 of the bed 101 of plants 103 by about 30 cm to about 80 cm (e.g., about 76 cm). In some examples, a distance between the lateral cameras 130 and the side surfaces 107 of the bed 101 is smaller than a distance between the upper cameras 130 and the top surface 105 of the bed 101. The hoods 132 are adapted to block (e.g., reduce the amount of) natural light, which varies depending on a season, weather, and a time of day, that would otherwise impinge upon the plants 103 in the fields of view.

One or more LEDs are located on each side of each camera 130. The LEDs have filters for sufficient illumination and desired image characteristics. The cameras 130 may be standard resolution, color video graphics array (VGA) cameras known to a person skilled in the art. For example, the cameras 130 may have a pixel count of 480×640 and image a 35 cm×45 cm field of view. The camera resolution (e.g., pixel dimension) of such a field of view may be 0.075 cm, which is adequate for identifying individual petioles 111, leaves 113, runners 117 and strawberries 115 of the plants 103. The cameras 130 can acquire images every 200 ms, allowing the cameras 130 to acquire three images of a same region of a plant 103 while the pruning system 100 moves at a predetermined speed (e.g., about 10 cm/s).

Figure 3B:
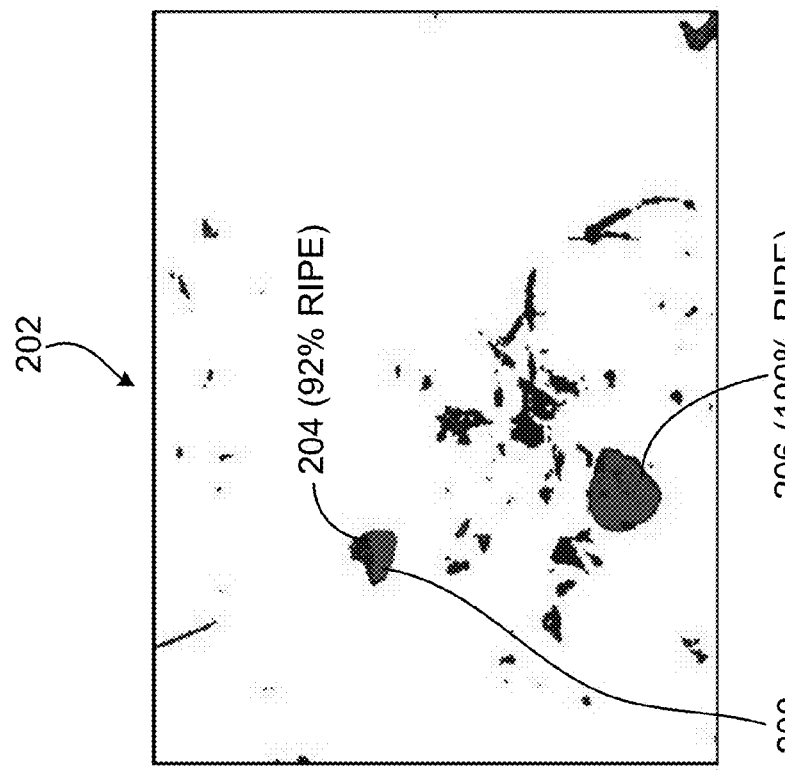
FIGS. 3A and 3B display a standard image acquired by a camera of the pruning system of FIG. 1 and a machine vision view generated by a processor of the camera, respectively.
Figure 3A:
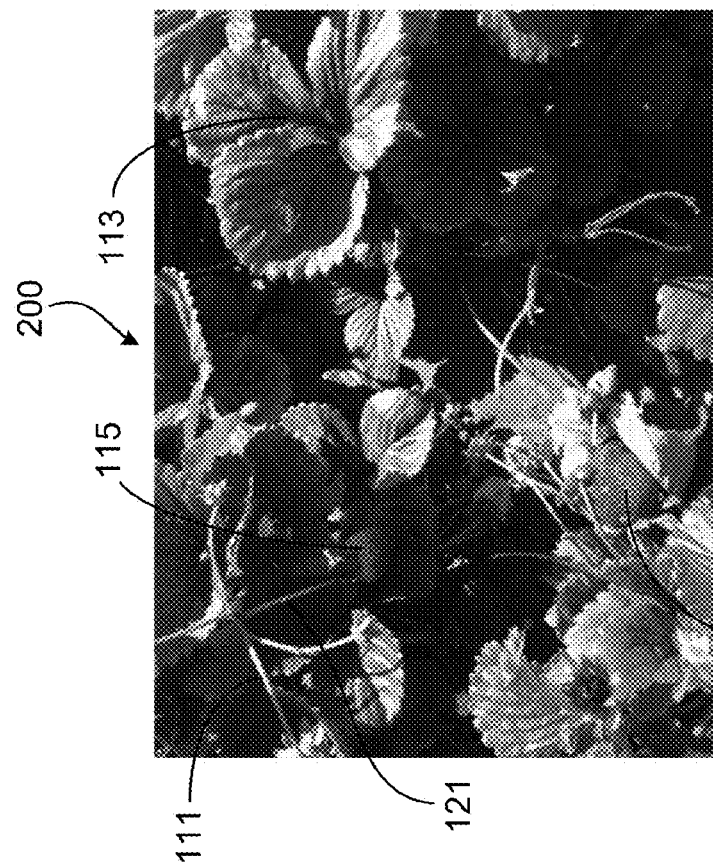

FIGS. 3A and 3B display an image 200 acquired by a camera 130, and a corresponding machine vision view 202 generated by a respective processor 134 of the camera 130, respectively. Following capture of the image 200 by the camera 130, the processor 134 performs a blob analysis on the image 200 to generate the machine vision view 202. That is, the processor 134 performs a mathematical analysis that finds regions in the image 200 that share the same one or more properties (e.g., the same one or more colors) and combines the regions into blobs. In particular, some regions of interest exhibit a range of red colors that meet a ripe color criterion (e.g., a ripe color threshold or ripe color range) for a strawberry 115 and a range of white colors (shown as blue in the machine vision view 202) that meet an unripe color criterion (e.g., an unripe color threshold or an unripe color range) for a strawberry 115. Accordingly, the processor 134 finds pixels in the image 200 that meet the ripe color criterion and pixels in the image 200 that meet the unripe color criterion.

The processor 134 then combines the pixels meeting the ripe and unripe color criteria (e.g., pixels that are adjacent or sufficiently close to each other) into a contiguous blob (e.g., as illustrated by the blobs 204, 206) and draws a border around the blob, thereby defining a pattern (e.g., a shape) of the blob. The processor 134 further determines a size of the blob (e.g., a length and/or a width of the respective pattern). The processor 134 compares the pattern and size of the blob to known (e.g., stored) patterns and sizes of strawberries. In some examples, the known patterns and sizes may be associated with shapes and sizes of entire strawberries or portions of strawberries. Blobs that have patterns that sufficiently match known patterns of strawberries and that meet a minimum size threshold (e.g., a stored threshold value) for a strawberry are identified as strawberries 115. Blobs that have patterns that do not have recognizable features (e.g., recognizable shape profiles) or that do not meet the minimum size threshold for a strawberry are ignored by the processor 134.

Once a blob is identified as a strawberry 115, the processor 134 determines a ripeness of the strawberry 115 by further analyzing the pixels that define the blob. In particular, a percentage ripeness (e.g., shown as 92% ripeness of the blob 204 and 100% ripeness of the blob 206) is calculated as a ratio of the area of the pixels meeting the ripe color criterion to the area of all of the pixels defining the blob.

Figure 4A:
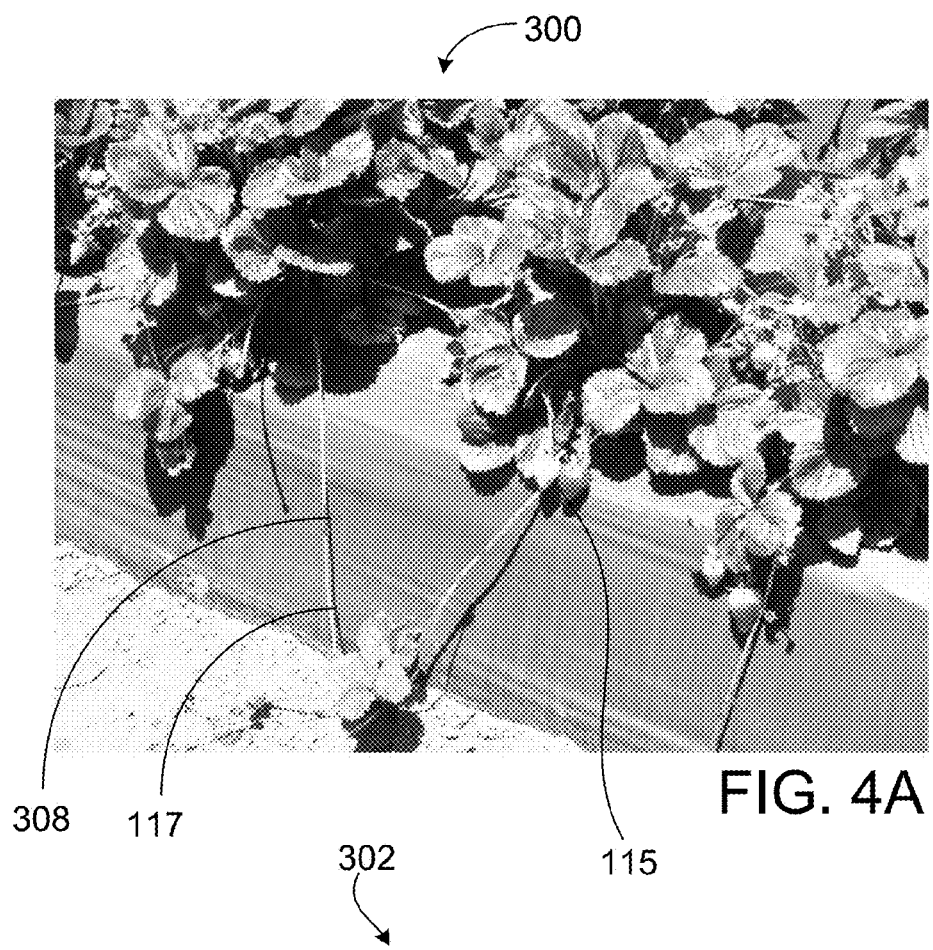
FIGS. 4A and 4B display a standard image acquired by a camera of the pruning system of FIG. 1 and a machine vision view generated by a processor of the camera, respectively.
Figure 4B:
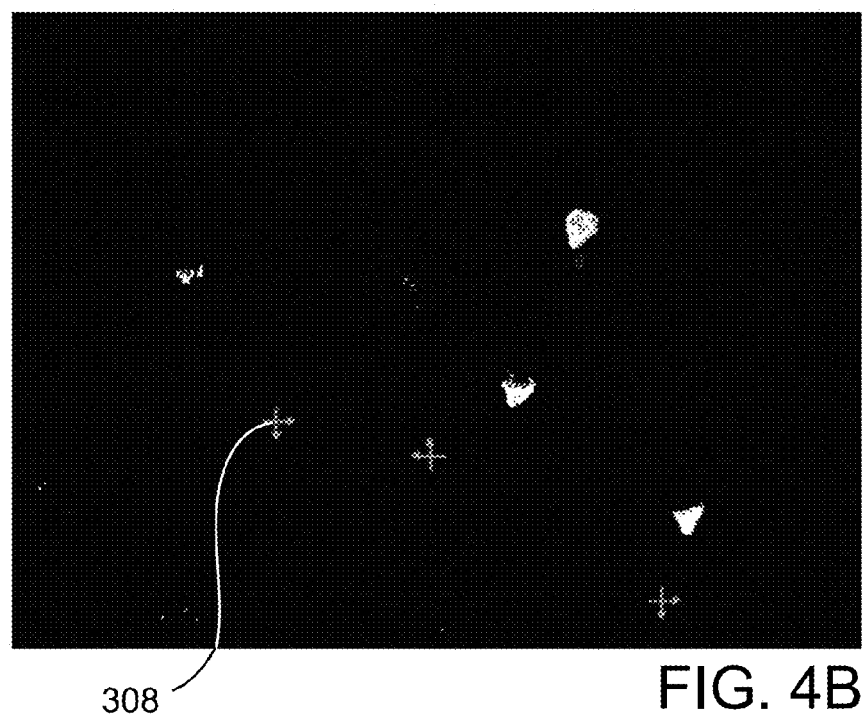

FIGS. 4A and 4B display an image 300 acquired by a camera 130, and a corresponding machine vision view 302 generated by a respective processor 134 of the camera 130, respectively. In addition to performing a blob analysis on an acquired image to identify strawberries 115 of the plants 103 (e.g., as described with respect to the image 200), the processor 134 further performs an additional blob analysis on the acquired image (e.g., the image 300) to identify runners 117 of the plants 103. In particular, the regions of interest exhibit a range of colors that meet a green color criterion (e.g., a color threshold or color range) associated with a runner 117, and the processor 134 finds pixels in the image 300 that meet the green color criterion.

The processor 134 then combines the pixels meeting the green color criterion (e.g., pixels that are adjacent or sufficiently close to each other) into a blob and draws a border around the blob, thereby defining the pattern (e.g., the shape) of the blob. The processor 134 further determines a relevant size parameter of the blob (e.g., a length and a width of the respective pattern). The processor 134 compares the pattern and size parameter of the blob to known (e.g., stored) patterns and sizes of runners. In some examples, the known patterns and sizes may be associated with shapes and sizes of entire runners or portions of runners. Blobs that have patterns that sufficiently match known patterns of runners and that meet a minimum size threshold (e.g., a stored threshold value) for a runner are identified as runners 117. Blobs that have patterns that do not have recognizable features (e.g., recognizable shape profiles) or that do not meet the minimum size threshold for a runner are ignored by the processor 134.

Referring particularly to FIGS. 3B and 4B, the processor 134 runs an algorithm to determine digital image position coordinates 208 of each strawberry 115 and digital image position coordinates 308 of each runner 117 (e.g., xy position coordinates of centroids of the respective blobs in a digital coordinate system of the digital image). The processor 134 further determines an orientation of each strawberry 115 and each runner 117 (e.g., defined as an angle of a major axis of the respective blob relative to an x axis or y axis extending through the digital image position coordinates of the blob). In some examples, the orientation of a strawberry 115 may be determined according to an orientation of a blob (e.g., corresponding to a stem attachment region) that is adjacent to the blob associated with the strawberry 115. For example, a stem attachment region (e.g., a portion of a stem 121 located at the top of a strawberry 115) may be identified by a separate color and pattern-based blob analysis. The processor 134 then provides the digital image position coordinates 208, 308, the orientations of the strawberries 115 and the runners 117, and the machine vision views (e.g., the machine vision views 202, 302) to the PLC 108. The processor 134 performs the analysis on each image (e.g., the images 200, 300) once the image is acquired and subsequently provides the resultant information to the PLC 108 in a continuous manner.

The PLC 108 stores all of the location and ripeness data of the strawberries 115 and the location data of the runners 117 so that the data can be compiled into a report that summarizes a state of the field. For example, the PLC 108 stores data including locations of the strawberries 115 and the runners 117, a number of the strawberries 115 and the runners 117 that have been located (e.g., a number of strawberries 115 and runners 117 per seed line 109, a number of strawberries 115 and runners 117 per bed 101, a total number of strawberries 115 and runners 117 in the field, etc.), a ripeness (e.g., a percentage ripeness) of the strawberries 115, a size (e.g., a length and a width) of the strawberries 115 and runners 117, a density of the strawberries 115 and runners 117 within the field, and a runner pruning rate (e.g., a number of runners 117 cut per unit time, a number of runners 117 cut per seed line, or a number of runners 117 cut per bed).

Using the above-described blob analyses, the pruning system 100 can quickly process large amounts of information to recognize patterns, determine ripeness, determine centroid locations, and determine orientations to locate plant components (e.g., runners and fruits). In contrast, conventional pruning systems using other types of analyses (e.g., spectral analyses) may, in some examples, only determine specific wavelengths of energy corresponding to respective regions in the images. As compared to such conventional analyses, the above-described blob analyses may be more accurate, provide more information, and be found to be more successful in correctly identifying runners and strawberries.

The PLC 108 processes the digital image position coordinates 208, 308, the orientations of the runners 117, the orientations of the strawberries 115, and the machine vision views (e.g., such as the machine vision views 202, 302) to generate a virtual Cartesian coordinate system (e.g., an xy coordinate system) that is located relative to the lens plane of the camera 130 and that accounts for the motion of the pruning system 100. In a continuous manner, the PLC 108 compiles the information associated with consecutive machine vision views (e.g., such as the machine vision views 202, 302) and determines a position of each runner 117 and strawberry 115 in the virtual coordinate system (e.g., the position of the runner 117 and strawberry 115 relative to a pruning device 162 of the pruning assembly 122, shown in FIG. 2), a ripeness of the strawberry 115, an orientation of the strawberry 115, and an orientation of the runner 117. The position, ripeness, and orientation of the strawberry 115 and the position and orientation of the runner 117 may be calculated as an average position, an average ripeness, and an average orientation based on respective positions, ripenesses, and orientations associated with the consecutive machine vision views. The PLC 108 may then provide instructions for controlling the pruning assembly 122 to cut the runner 117 from the plant 103 while working around the strawberries 115 based on the positions of the strawberries 115 and the position of the runner 117 in the virtual coordinate system. The pruning assembly 122 is controlled to cut all of the runners 117 identified by the machine vision system 120.

FIGS. 5A-5C show an image 400 acquired by the camera 130, an enhanced image 404 produced by the processor 134, and a machine vision view 402 generated by the processor 134, respectively. In some examples, the processor 134 varies the Red Green Blue (RGB) data of the pixels (e.g., such that the Red level is greater than twice the Green level and such that the Red level is twice the Blue level) in the image 400 prior to performing the blob analyses, in order to brighten the image 400, to enhance the pixel colors in the image 400, and/or to increase contrast among the colors in the image 400, thereby producing the enhanced image 404 (displaying a portion of the image 400 provided in the rectangular outline). Such processing can improve the detection of strawberries 115 and runners 117 in dim light (e.g., at night or when the strawberries 115 and runners 117 are shadowed by leaves 113, petioles 111, or other plant material) or in cases where the coloration of the strawberries 115 and runners 117 is affected by moisture or other environmental contaminants.

Referring again to FIG. 2, the pruning system 100 includes plant manipulation devices that may be used to move the petioles 111, leaves 113, and other plant materials from side to side in order to expose hidden strawberries 115 and runners 117 to the respective camera 130. According to an actuation rate of the manipulation devices and the image acquisition rate (e.g., 5 fps) of the camera 130, at least one of the three images showing a particular region of the plant 103 will capture a particular strawberry 115 or a particular runner 117 in an exposed state. In one example, the manipulation devices are air nozzles 136 located on opposite sides of an internal surface of the hood 132. The air nozzles 136 can apply controlled bursts of air to the plants 103 in an alternating manner while the camera 130 acquires images of the plants 103. Accordingly, the alternating air bursts from the nozzles 136 on either side of the seed line 109 move the petioles 111, leaves 113, and other plant materials from side to side to expose hidden strawberries 115 and runners 117.

In another example, the plant manipulation device is a flexible comb 138 that is mounted to the hood 132 at a location below the camera 130 and above the plants 103. The comb 138 has flexible finger-like projections 140 that extend down into the plants 103 and are moved back and forth across the plants 103 while the camera 130 acquires images of the plants 103. In this manner, the finger-like projections 140 move the petioles 111, leaves 113, and other plant materials from side to side to expose hidden strawberries 115 and runners 117. While examples of each of these plant manipulation devices are shown in FIG. 2 for purposes of illustration, it will be understood that either or both of these devices may be provided to manipulate the plants 103 along any given seed line 109.

Still referring to FIG. 2, the pruning assembly 122 includes an upper movement frame 142 located above the bed 101 of plants 103 and two lateral movement frames 144 respectively spaced from the side surfaces 107 of the bed 101 of plants 103. The upper movement frame 142 includes two opposing horizontal rails 146 oriented parallel to a length of the bed 101 and a horizontal rail 148 oriented perpendicular to the length of the bed 101. The horizontal rail 148 extends between and is moveable along the horizontal rails 146 via opposing clamps 150. The upper movement frame 142 further includes a clamp block 152 that is moveable along the horizontal rail 148. The clamp block 152 carries a vertical rail 154 (e.g., oriented perpendicular to the top surface 105 of the bed 101) that is moveably secured to the clamp block 152. In this manner, the vertical rail 154 is moveable vertically with respect to the clamp block 152 and moveable horizontally along the horizontal rail 148. In some examples, the horizontal rails 146, 148 are positioned about 4 cm to about 12 cm (e.g., about 8 cm) below the frame 102 of the pruning system 100.

Each lateral movement frame 144 includes two rails 156 oriented parallel to the length of the bed 101 and a rail 158 extending between the two rails 156. The rail 158 is moveable along the rails 156 via opposing clamps 150. Each lateral movement frame 144 further includes a clamp block 152 that is moveable along the rail 158 and a rail 160 (e.g., oriented perpendicular to the side surface 107 of the bed 101) that is moveably secured to the clamp block 152. In this manner, the rail 160 is moveable perpendicularly with respect to the clamp block 152 and moveable axially along the rail 158. In some embodiments, the rails 156, 158 are positioned with respect to the frame 102 of the pruning system 100 such that the rails 156, 158 are spaced about 10 cm to about 20 cm (e.g., about 15 cm) from the side surfaces 107 of the beds 101 (as measured perpendicularly from the side surfaces 107 of the beds).

The pruning assembly 122 further includes three pruning devices 162 (e.g., robotic pruners) that are moveable by the upper movement frame 142 and by the lateral movement frames 144. In particular, an upper pruning device 162 extends from the vertical rail 154 of the upper movement frame 142 and two lateral pruning devices 162 respectively extend from each of the rails 160 of the lateral movement frames 144. The movement frames 142, 144 are positioned rearward of the machine vision systems 120 (i.e., rearward relative to the direction of travel 119 of the pruning system 100). Accordingly, the pruning devices 162 follow behind the cameras 130. For example, the pruning devices 162 may be positioned about 40 cm to about 80 cm (e.g., about 60 cm) rearward of the cameras 130. Accordingly, the pruning devices 162 are located outside of the fields of view of the cameras 130 and are guided to prune runners 117 that have been identified based on previously acquired images while the cameras 130 continue to acquire and process new images.

According to control signals provided by the PLC 108 based on images previously acquired by the respective camera 130, the horizontal rail 148 can be moved along the horizontal rails 146 to move (i.e., translate) the upper pruning device 162 along or opposed to the direction of travel 119 of the pruning system 100, and the respective clamp block 152 can be moved along the horizontal rail 148 to move (i.e., translate) the upper pruning device 162 along a direction that is transverse to the direction of travel 119. In this manner, the horizontal rail 148 and the clamp block 152 can be controlled to move the upper pruning device 162 along the top surface 105 of the bed 101 in each of the x and y directions of the virtual coordinate system in the lens plane of the respective camera 130. Similarly, according to control signals provided by the PLC 108 based on the images previously acquired by the camera 130, the vertical rail 154 can be controllably moved with respect to the clamp block 152, to move (i.e., translate) the upper pruning device 162 perpendicularly with respect to the top surface 105 of the bed 101. In this manner, the upper pruning device 162 can be moved toward or away from the top surface 105 of the bed 101 in a direction (a z direction) that is perpendicular to the x and y directions of the digital coordinate system located in the lens plane of the camera 130 to prune runners 117 that have been identified based on the previously acquired images while the cameras 130 continue to acquire and process new images.

According to control signals provided by the PLC 108 based on images previously acquired by the respective camera 130, the rails 158 can be moved along the rails 156 to move (i.e., translate) the lateral pruning devices 162 along the side surfaces 107 of the beds 101, and the respective clamp blocks 152 can be moved along the rails 158 to adjust a height of the lateral pruning devices 162. In this manner, the rails 158 and the clamp blocks 152 can be controlled to move the lateral pruning devices 162 along the side surfaces 107 of the beds 101 in each of two orthogonal directions of the lens plane of the respective camera 130. Similarly, according to control signals provided by the PLC 108 based on the images previously acquired by the camera 130, the rails 160 can be controllably moved with respect to the clamp block 152 to move (i.e., translate) the lateral pruning devices 162 perpendicularly with respect to the side surfaces 107 of the bed 101. In this manner, the lateral pruning devices 162 can be moved toward or away from the side surfaces 107 of the bed 101 in a direction (a z direction) that is perpendicular to the x and y directions of the digital coordinate system located in the lens plane of the camera 130 to prune a selected runner 117 based on the previously acquired images. In some examples, the rails 148, 154, 158, 160, and the clamp blocks 152 are moved at speeds between about 1 cm/s and about 60 cm/s to translate the pruning devices 162.

Each of the pruning devices 162 includes an extension member 164 that projects from a respective rail 154, 160, a suction tube 166 that projects from the extension member 164, and a cutter 168 located at an end of the suction tube 166. Each of the pruning devices 162 includes a proximity sensor (e.g., a laser sensor) and a color sensor (e.g., a laser sensor) that are located along the suction tube 166. The proximity sensor (e.g., such as a proximity sensor 170 shown in FIGS. 6 and 7) is responsive to distance between the pruning device 162 and an object (e.g., a runner 117 identified by the processor 134 of the respective camera 130). Once a pruning device 162 is positioned according to the xy position coordinates of the identified runner 117, the pruning device 162 is moved toward (e.g., in the z direction with respect to the virtual coordinate system) the runner 117 until the proximity sensor is within a predetermined distance (e.g., about 2 cm) of an object at which the object is drawn into the suction tube 166.

The color sensor (e.g., such as a color sensor 172 shown in FIGS. 6 and 7) analyzes reflected light after stimulation of an object with a laser beam to indicate the color of the object. Based on a signal from the color sensor, the PLC 108 confirms whether the sensed object is the color of a runner (e.g., a green runner 117 as opposed to a red strawberry 115). Upon determining that the sensed object proximate the cutter 168 is a runner 117, the pruning device 162 is actuated to draw the runner 117 into the suction tube 166 and to cut the runner 117 with the cutter 168.

Figure 6:
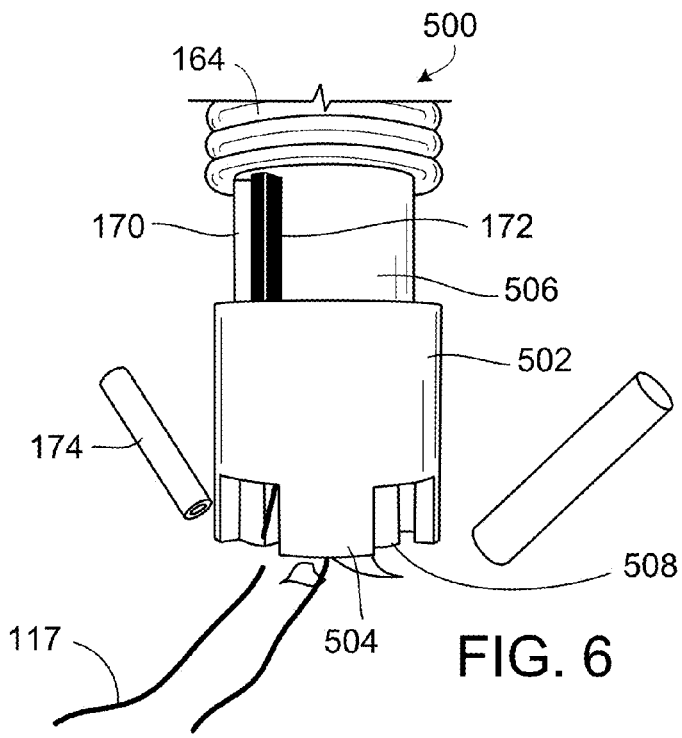
FIG. 6 is a perspective view of one example of a pruning device of the pruning system of FIG. 1.

FIG. 6 illustrates one example of the pruning device 162, in the form of a suction pruner 500. The suction pruner 500 includes the extension member 164, a suction tube 506, and a cutter 502 (e.g., an oscillating cutter) secured to an end of the suction tube 166. The cutter 502 includes teeth 504 that provide sharp cutting blades capable of severing plant components. The suction pruner 500 further includes a proximity sensor 170 and a color sensor 172 that are located along the suction tube 506. The suction pruner 500 utilizes suction (i.e., a vacuum or negative gage pressure) to pull a runner 117 into the suction tube 506 and severs the runner 117 extending across the teeth 504 of the cutter 502. A toothed edge 508 of the suction tube 506 further supports the runner 117 as the runner 117 is severed by the cutter 502.

In some examples, air is drawn into the suction tube 506 at a volumetric flow rate of at least 8.5 $m^3$/min and at a speed of about 200 km/h to about 500 km/h (e.g., about 258 km/h). In some examples, the suction tube 506 has a diameter of about 2 cm to about 10 cm (e.g., about 5 cm). The volumetric flow rate of the air may vary as a function of the diameter of the suction tube 506 in order to achieve the desired air speed (e.g., about 258 km/h). The cutter 502 may rotate continuously around the suction tube 506 or oscillate back and forth along a portion (e.g. an arc defined by about 90° of the circumference) of the suction tube 506, thereby causing the teeth 504 of the cutter 502 to sever a runner 117 that is pulled up into the suction tube 506 and across the teeth 504 of the cutter 502.

Figure 7:
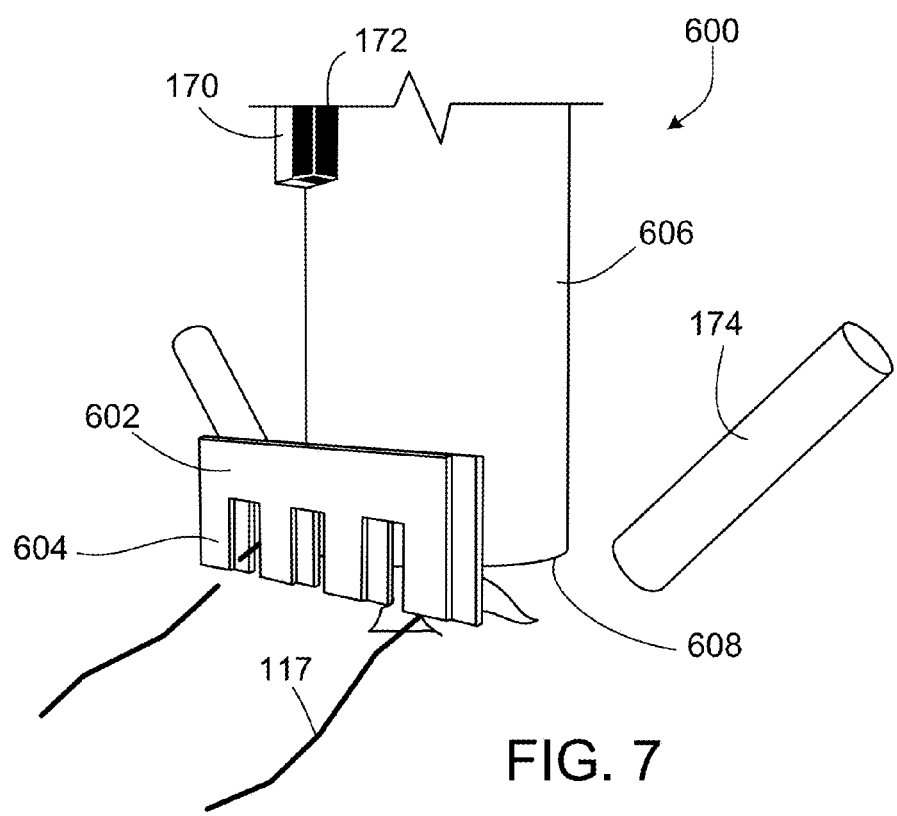
FIG. 7 is a perspective view of another example of a pruning device of the pruning system of FIG. 1.

FIG. 7 illustrates another example of the pruning device 162, in the form of a suction pruner 600. The suction pruner 600 includes the extension member 164 (shown in FIGS. 2 and 6), a suction tube 606, and a cutter 602 (e.g., an oscillating cutter) secured to an end of the suction tube 606. The cutter 602 includes teeth 604 that provide sharp cutting blades capable of severing plant components. In contrast to the cutter 502 of the suction pruner 500 of FIG. 6, the cutter 602 is formed as a straight (e.g., non-rounded) cutter. The suction pruner 600 also includes the proximity sensor 170 and the color sensor 172 of the suction pruner 500. Like the suction pruner 500, the suction pruner 600 utilizes suction to pull a runner 117 into the suction tube 606 and severs the runner 117 extending across the teeth 604 of the cutter 602. Air is drawn through the suction tube 606 of the suction pruner 600 in the manner described above with respect to the suction pruner 500. The cutter 602 may oscillate back and forth along one side (e.g. a portion of the suction tube 606 defined by about 120° of the circumference) of the suction tube 606, thereby causing the teeth 604 of the cutter 602 to sever a runner 117 that is pulled up into the suction tube 606 and across the teeth 604 of the cutter 602. An edge 608 of the suction tube 606 further supports the runner 117 as the runner 117 is severed by the cutter 602.

Preferably, the cutters 602 of the upper suction pruners 600 located above the beds 101 of plants 103 are positioned along a trailing (e.g., rear) side of the suction tubes 606 so that runners 117 captured within the suction tubes 606 are pulled across the teeth 604 of the cutters 602 as the suction pruners 600 travel away from points at which the runners 117 are attached to the plants 103. The cutters 602 of the lateral suction pruners 600 located along the side surfaces 107 of the beds 101 are positioned along a top side of the suction tubes 606 so that runners 117 captured within the suction tubes 606 are pulled across the teeth 604 of the cutters 602 as the suction pruners 600 travel downward toward the ground.

Figure 8:
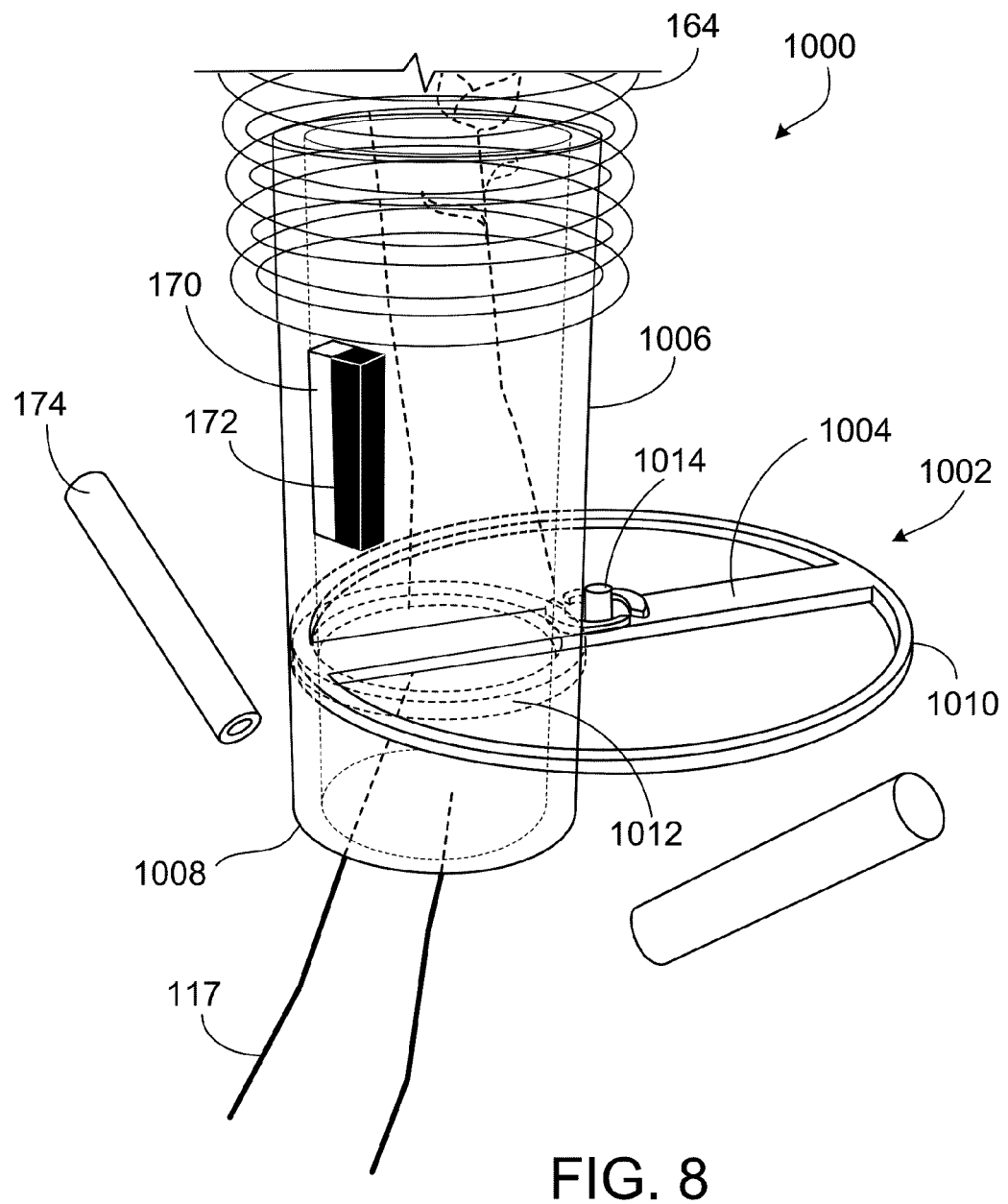
FIG. 8 is a perspective view of another example of a pruning device of the pruning system of FIG. 1.

FIG. 8 illustrates another example of the pruning device 162, in the form of a suction pruner 1000. The suction pruner 1000 includes the extension member 164 (shown in FIGS. 2, 6, and 7), a suction tube 1006, and a cutter 1002 (e.g., a rotary cutter) disposed near an end region of the suction tube 1006. The cutter 1002 includes an annular disk 1010 that is sized to rotate within a cylindrical opening 1012 of the suction tube 1006. The cutter 1002 further includes a blade 1004 extending across a center of the annular disk 1010 that is capable of severing plant components. The cutter 1002 is operable to rotate about a pin 1014 positioned adjacent the suction tube 1006 such that the blade 1004 swings through the suction tube 1006 as the cutter 1002 rotates about the pin 1014. The suction pruner 1000 has a guard (not shown) that surrounds the cutter 1002 and seals the cutter 1002 against the suction tube 1006 so that vacuum is not lost through the cylindrical opening 1012 as the cutter 1002 rotates. The suction pruner 1000 also includes the proximity sensor 170 and the color sensor 172 of the suction pruners 500, 600.

In contrast to the cutters 502, 602 of the suction pruners 500, 600 of FIGS. 6 and 7, the cutter 1002 is configured to perform the cutting operation inside of the suction tube 1006. Like the suction pruners 500, 600, the suction pruner 1000 utilizes suction to pull a runner 117 into the suction tube 1006. Within the suction tube 1006, the blade 1004 of the cutter 1002 severs the runner 117. Owing to the continual sweeping of the blade 1004 through the suction tube 1006, the runner 117 can be cut into multiple short portions until the runner 117 is pulled up to a position where a remaining end of the runner 117 no longer contacts the blade 1004. Accordingly, the cut portions of the runner 117, entrained within the airflow inside of the suction tube 1006, are drawn further into the suction tube 1006 and prevented from falling to the ground, which may sometimes occur when an external cutter is used to sever the runner 117. Air is drawn through the suction tube 1006 of the suction pruner 1000 in the manner described above with respect to the suction pruners 500, 600. An edge 1008 of the suction tube 1006 further supports the runner 117 as the runner 117 is severed by the cutter 1002.

Referring to FIGS. 6-8, the pruning system 100 further includes air delivery jets 174 positioned near opposite sides of an end of the suction tube 506, 606, 1006 and that deliver air to the bed 101 to help lift a runner 117 up from the bed 101 so that the runner 117 can be captured by the vacuum generated within the suction tube 506, 606, 1006. Once the runner 117 is elevated from the bed 101, the suction tube 506, 606, 1006 draws the runner 117 into the suction tube 506, 606, 1006. The air delivery jets 174 may be turned off when the cutter 502, 602, 1002 is positioned near a strawberry 115 so as to avoid disturbing the strawberry 115 and turned on when the cutter 502, 602, 1002 is near a runner 117.

Figure 9:
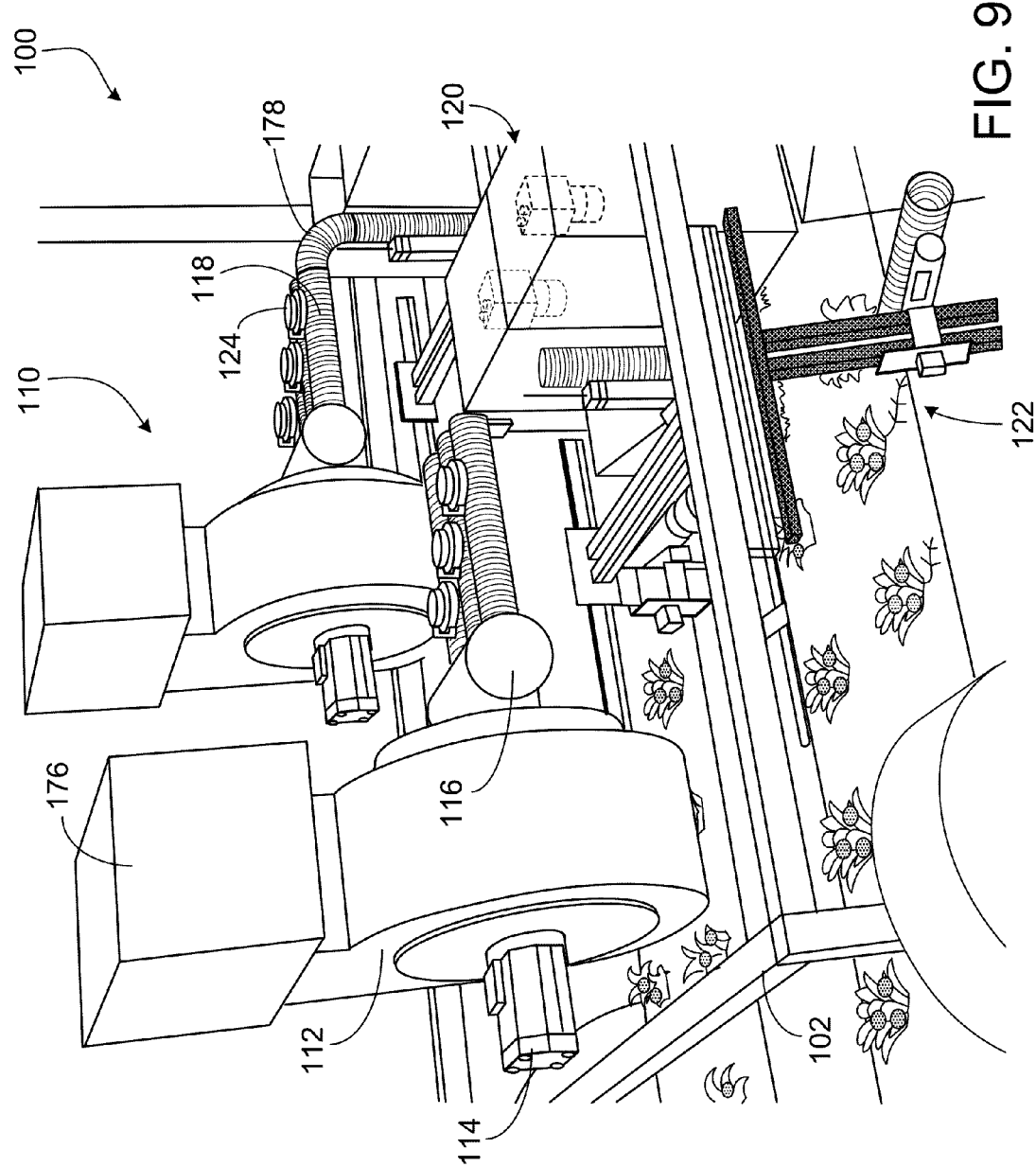
FIG. 9 is a perspective view of a portion of the pruning system of FIG. 1.

Referring to FIG. 9, the portion of the pruning system 100 that passes over each bed 101 further includes two suction control systems 110 that control the airflow within the pruning devices 162. Each suction control system 110 includes a blower 112 (e.g., a centrifugal blower) that generates a suction pressure and a motor 114 (e.g., a hydraulic motor or an electrical motor) that powers the blower 112. The blower 112 includes an air intake manifold 116 that has three connections 118 for respective fluidic coupling to the suction tubes 166 of the pruning devices 162 and three respective gate valves 124 that are operable to open and close the connections 118 to respectively turn off and on the suction tubes 166. The suction control system 110 also includes flexible suction tube lines 178 that respectively couple the connections 118 to the suction tubes 166 (only one tube line 178 is illustrated for clarity).

When a gate valve 124 on the respective connection 118 is open, air is pulled through the gate valve 124 such that the suction tube 166 is bypassed without generating a vacuum pressure within the suction tube 166, thereby effectively turning the suction tube 166 'off' such that plant components are not drawn into the suction tube 166. When a gate valve 124 on the respective connection 118 is closed, air is pulled through the respective suction tube 166, thereby generating a vacuum pressure within the suction tube 166 and effectively turning the suction tube 166 'on' such that a runner 117 can be drawn into the suction tube 166 and severed by the cutter 168. The severed runner 117 and any other plant components or debris drawn into the suction tube 166 are drawn into the blower 112 and collected in a container 176 (e.g., a filter box) disposed atop the blower 112. The container 176 may be emptied as desired to discard the runners 117 and other debris.

In operation, the pruning system 100 may be steered by an operator as it travels along the beds 101 of plants 103. As the pruning system 100 travels in the field, communication is maintained over a network between the operator, the PLC 108, the wheel encoder 126 (e.g., to indicate a distance traveled by the pruning system 100), and the GPS system so that a status of the pruning system 100 can be monitored. Example monitored parameters include a system location, a system velocity (e.g., determined according to the angular velocity of the wheels), locations of the strawberries 115 and the runners 117, a number of the strawberries 115 and the runners 117 that have been located, a ripeness of the strawberries 115, a size of the strawberries 115 and runners 117, a density of the strawberries 115 and runners 117 within the field, and a runner pruning rate. All of this data can be compiled into a field report that summarizes a state of the field. The operator may change the location and/or the velocity of the pruning system 100 by sending appropriate instructions over the network to the PLC 108 of the pruning system 100.

Figure 10:
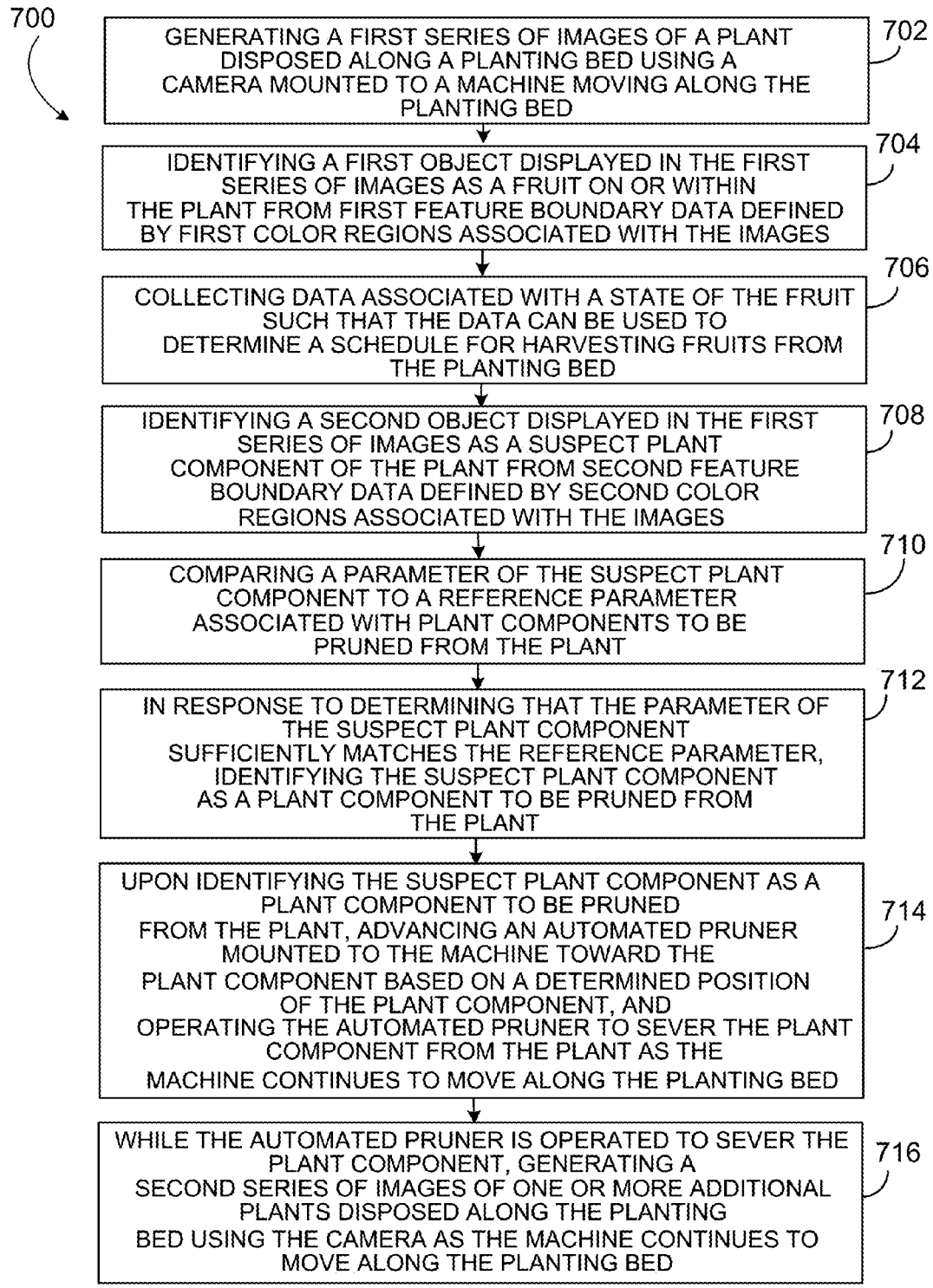
FIG. 10 is a flow chart of an example process for managing plant production.

FIG. 10 displays a flow chart of an example process 700 for managing plant production (e.g., a produce of a strawberry plant) using the pruning system 100. As the pruning system moves along a bed, each camera generates (e.g., acquires) a series of images of a particular plant disposed along the bed (702). In some examples, the camera generates images at a rate of 5 fps, allowing the camera to generate three images of a same region of the plant while the pruning system moves at a predetermined speed (e.g., about 10 cm/s). While the camera generates the series of images, one or more manipulating devices (e.g., one or more air nozzles and/or flexible combs) are actuated to move petioles and leaves of the plant from side to side to expose hidden runners and hidden strawberries to the cameras.

The respective processor then identifies a first object displayed within the series of images as a strawberry on or within the plant from feature boundary data defined by color regions associated with the images (704). For example, the processor may perform a blob analysis on the images by combining pixels that are adjacent or sufficiently close to each other and meeting a ripe color (e.g., red) criterion and an unripe color (e.g., white) criterion (e.g., identifying a strawberry) into a blob. The processor then determines a border around the blob, thereby defining a pattern (e.g., a shape) of the blob. The processor also determines a size of the blob. The processor compares the pattern and size of the blob to known patterns and sizes of strawberries. A blob that has a pattern that sufficiently matches a known pattern of strawberries and that meets a minimum size threshold is identified as a strawberry.

Upon identifying the strawberry, the PLC collects data associated with the state of the strawberry so that the data can be used to determine a schedule for harvesting strawberries from the bed at a later time (706). For example, a percentage ripeness of the strawberry may be calculated as a ratio of the area of the pixels meeting the ripe color criterion to the area of all of the pixels defining the blob. Additionally, the PLC generates and stores a location of the strawberry, a size of the strawberry, and a count associated with the strawberry such that the strawberry can be accounted for in number of strawberries that have been located and a density of strawberries across the field. Any combination of such parameters can indicate the state (e.g., a health, a quality, or a growth level) of the strawberry. Furthermore, in combination with data collected regarding additional strawberries and data collected regarding runners pruned from the field, such parameters can be used to generate an overall assessment of the field and used for determining a fertilizing schedule, a watering schedule, and a harvesting schedule for the respective bed or the entire field.

The processor also identifies a second object displayed within the series of images as a suspect runner on or within the plant from feature boundary data defined by color regions associated with the images (708). For example, the processor may perform an additional blob analysis on the images by combining pixels that are adjacent or sufficiently close to each other and meeting a green color criterion (e.g., identifying a runner) into a blob. The processor then determines a border around the blob, thereby defining a pattern (e.g., a shape) of the blob. The processor also determines a size of the blob. The processor compares a parameter (e.g., the pattern or the size) of the suspect runner to a reference parameter (e.g., known patterns or known sizes) associated with runners to be pruned from the plant (710). In response to determining that the parameter of the suspect runner sufficiently matches the reference parameter, the processor identifies the suspect runner as a runner to be pruned from the plant (712). For example, A blob that has a pattern that sufficiently matches a known pattern of runners and that meets a minimum size (e.g., length) threshold is identified as a runner.

Upon identifying the suspect runner as a runner to be pruned from the plant, an automated pruner is advanced toward the runner based on a determined position of the runner and operated to sever the runner from the plant as the pruning system continues to move along the bed (714). For example, the processor identifies the runner as a runner to be pruned from the plant and provides the digital position coordinates of the runner, the orientation of the runner, and machine vision views of the images to the PLC. Additionally, the encoder provides the angular speed of the wheels to the PLC.

The PLC then combines the machine vision views into a single machine vision view that extends along the direction of the bed to determine the xy position (e.g., average position) and orientation (e.g., average orientation) of the runner in the virtual xy coordinate system generated by the PLC. For example, accounting for the angular speed of the wheels, the PLC calculates the xy position of the selected runner with respect to the respective pruning device and sends commands to a motion controller accordingly. The motion controller then controls servomotors that move the appropriate rails, clamps and clamp blocks of the respective movement frame to align the pruning device with the xy position of the runner. The pruning device is then advanced towards the runner (e.g., along the z direction) while the proximity sensor of the pruning device is monitored.

In response to a signal from the proximity sensor indicating that the pruning device is within a predetermined distance of an impediment, the color sensor of the pruning device detects a color of the impediment and confirms based on the color of the impediment that the impediment is a runner. In some examples, the pruning device detects the color of the impediment within close proximity to the impediment, such as at a predetermined distance of about 1 cm to about 3 cm (e.g., about 2 cm). Upon confirming that the proximate object is the runner, the pruning device is actuated to draw the runner into the suction tube of the pruning device and to cut the runner from the plant along a cutter of the pruning device. During operation, the pruning device is moved around the identified strawberries based on the locations of the identified strawberries in a manner that avoids contact with or damage to the strawberries. Once the runner is pruned from the plant, the runner is drawn into the blower and further into the debris container disposed atop the blower.

The PLC also collects data associated with the identified runner so that the data can be used to manage production of the field. For example, the PLC generates and stores a location of the runner, a size of the runner, and a count associated with the runner such that the runner can be accounted for in number of runners that have been located and a density of runners pruned from the field. Any combination of such parameters can be used alone or in combination with data associated with identified strawberries and additional runners to generate an overall assessment of the field and used for determining a fertilizing schedule, a watering schedule, and a harvesting schedule for the respective bed or the entire field.

While the automated pruner is operated to sever the runner, the camera continues to generate additional images of one or more additional plants disposed along the bed (e.g., and located ahead of the automated pruner) as the pruning system continues to move along the bed. (716). Owing to the simultaneous actions of the cameras, the respective processors, and the respective pruning devices, the pruning system can achieve a runner pruning rate as fast as one runner every 2 seconds, such that the pruning system may prune up to 30 runners per minute. In contrast, many conventional systems that prune the strawberry plants only subsequent to completing image acquisition and processing achieve pruning rates of up to about one runner every 5 seconds. Accordingly, the pruning system may be used to prune runners in a much faster manner than some conventional automated pruners, while avoiding damage to fruits within the plants.

During operation of the pruning system, the data collected regarding the identified strawberries and the pruned runners may be compiled at predetermined times and provided in a report that summarizes the state of the field. For example, the data may be provided in a table, a spreadsheet, a list, a prose summary, an audio record, or a video or image record. In some examples, the report is displayed on a monitor, outputted to a printing device, or sounded on an audio device located proximate or remote from the pruning system. In some cases, the report is stored within the PLC for later access or sent over a network to a remote computing system. In some examples, a series of reports is generated according to a certain interval (e.g., upon pruning a particular number of beds). In some cases, a report is generated upon completion of a pruning operation of the entire field.

The report may then be analyzed by a grower to perform one or more of evaluating the field, determining a fertilizing schedule for the field, determining a watering schedule for the field, and determining a harvesting schedule for the field. In some cases, one or more processors of the pruning system or of a remote computing system analyze the report to automatically evaluate the field, automatically determine a fertilizing schedule for the field, automatically determine a watering schedule for the field, and automatically determine a harvesting schedule for the field according to an algorithm executed on the one or more processors.

While the pruning system 100 of FIG. 1 is illustrated and described as operating over particular raised beds 101 of plants 103, in pruning other types of plants (e.g., grape, kiwi, tomato, peach, nectarine, fig, olive, walnut, chestnut, pecan, almond, cherry, apple, pear, plum, apricot, and citrus plants), the beds and plants may be of different configurations and a pruning system that is substantially similar in one or both of construction and a function to the pruning system 100 may be configured accordingly. Furthermore, while the pruning system 100 is illustrated and described as operating over two spaced beds 101 of strawberry plants 103, in other examples a pruning system that is substantially similar in construction and function to the pruning system 100 can be configured to operate on more than two beds of strawberry plants (e.g., four or six beds of strawberry plants).

While the pruning system 100 has been described and illustrated as including one machine vision system 120 and one pruning assembly 122 per bed 101 of plants 103, other examples may include a different number machine vision systems and pruning devices. Furthermore, a pruning system may include a different number of cameras 130 (e.g., per machine vision system 120) and pruning devices 162 (e.g., per pruning assembly 122).

While the pruning assembly 122 of the pruning system 100 has been described as operating via a three-axis (e.g., xyz) movement system (e.g., provided by the upper and lateral movement frames 142, 144) providing three degrees of freedom, in some embodiments, a pruning assembly of a substantially similar pruning system may operate via a movement system that provides additional degrees of freedom. For example, in some embodiments, a pruning system may operate via a six-axis system that provides for both translation and rotation about each of the x, y, and z axes, thereby providing six degrees of freedom. In further embodiments, one or two additional degrees of freedom (e.g., translation and/or rotation) may be provided at a distal end of a pruning device of the three-axis system or the six-axis system, thereby providing a four, five, seven, or eight-axis system that provides respective degrees of freedom.

While the pruning system 100 has been described as including machine vision systems 120, some pruning system do not include machine vision capabilities. Such simplified pruning systems may be used during early stages of strawberry plant growth, during which the plants have a relatively small size, are in a vegetative state and bearing little to no fruit, and produce a relatively large quantity of runners. Accordingly, the plants can be pruned using simplified pruning systems that do not incur the cost of a vision system.

Figure 11:
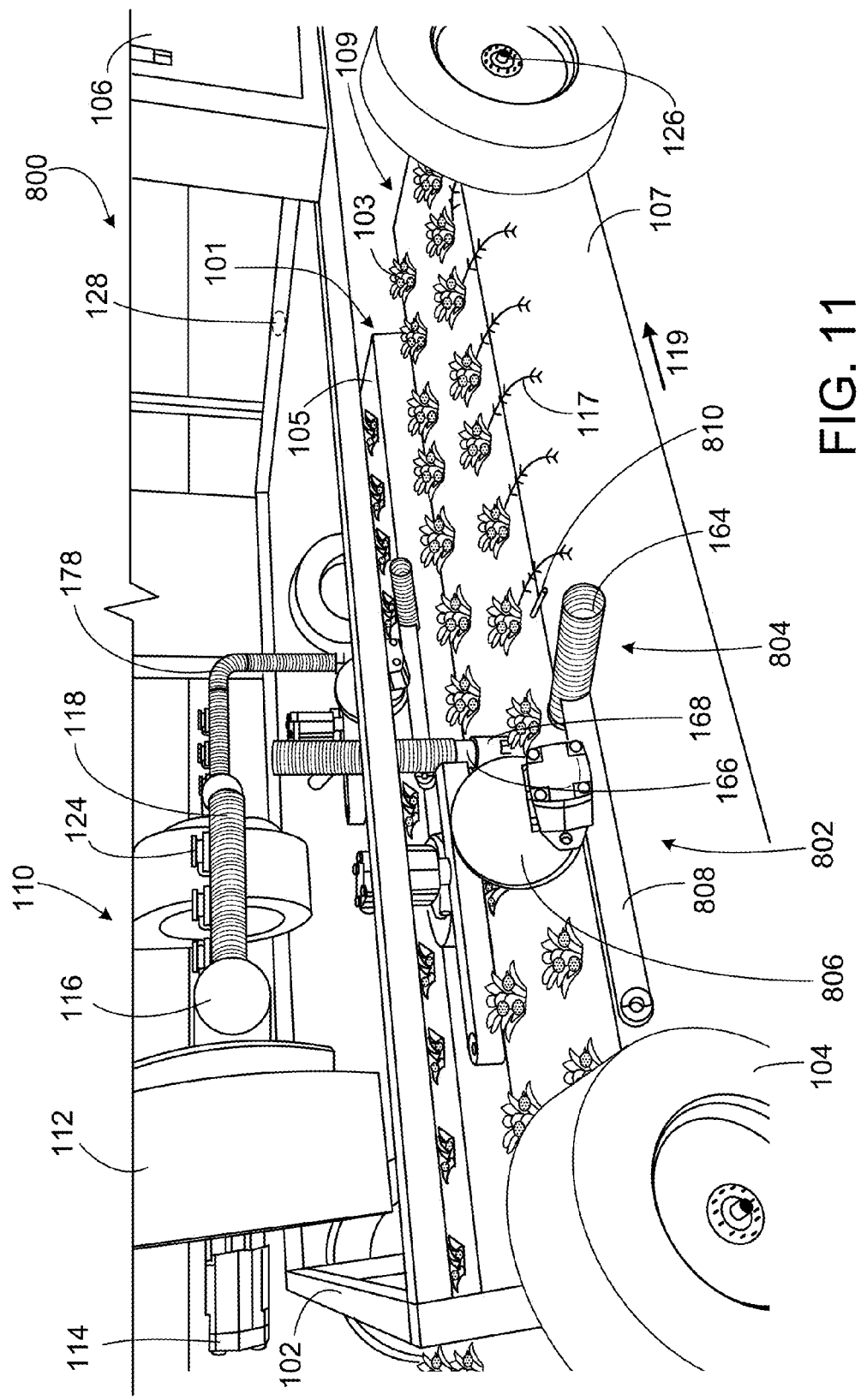
FIG. 11 is a perspective view of another pruning system.

For example, FIG. 11 displays a perspective view of a pruning system 800 that is operable to remove a variety of plant components (e.g., runners) from plants in an automated manner and that lacks a machine vision system. In some examples, the pruning system 800 is self-propelled and steered by an operator (e.g., an operator riding atop the pruning system 800, or a remote operator). In some examples, the pruning system 800 may be configured to operate autonomously based on GPS mappings. The pruning system 800 may be configured to operate with other vehicles, such as a tractor that can pull and guide the pruning system 800 through a field. In such cases, the pruning system 800 may be attached to the tractor via a three-point hitch or any other suitable attachment mechanisms known to a person skilled in the art. In the example of FIG. 11, the pruning system 800 is positioned over the beds 101 of plants 103 (e.g., strawberry plants) described with respect to FIG. 1.

The pruning system 800 includes the frame 102, the wheels 104, the electrical enclosures 106, the PLC 108, the suction control system 110, the encoder 126, and the ultrasonic sensor 128 of the pruning system 100, as well as other standard electrical components (e.g., a generator, batteries, and other components) and standard mechanical components required for the operation of the pruning system 800.

The pruning system 800 further includes two pruning assemblies 802 that respectively travel along the beds 101 of plants 103. Each pruning assembly 802 includes three pruning devices 804 (e.g., suction pruners), three respective drives 806 (e.g., rotating drives) that carry the pruning devices 804 along the beds 101, and three sets of air delivery jets 174 of the pruning system 100. The pruning devices 804 are substantially similar to the pruning devices 162 of the pruning system 100 of FIG. 1, except that the pruning devices 804 do not include proximity sensors or color sensors. Accordingly, each of the pruning devices 804 includes the extension member 164, the suction tube 166, and the cutter 168 and can be embodied as any of the suction pruners 500, 600, 1000 of FIG. 6, FIG. 7, or FIG. 8 but without the laser and color sensors 170, 172. The pruning devices 804 are respectively coupled to the drives 806 via attachment members 808.

An upper pruning assembly 802 is positioned above the bed 101, and two lateral pruning assemblies 802 are positioned along opposite sides of the bed 101. In some embodiments, the upper drive 806 is positioned about 4 cm to about 8 cm (e.g., about 6 cm) below the frame 102 of the pruning system 800. In some embodiments, the lateral drives 806 are positioned with respect to the frame 102 of the pruning system 800 such that lateral drives 806 are spaced about 10 cm to about 20 cm (e.g., about 15 cm) from the side surfaces 107 of the beds 101 (as measured perpendicularly from the side surfaces 107 of the beds). Two proximity sensors 810 (e.g., laser distance sensors) are respectively associated with and positioned forward of the upper pruning device 804. One proximity sensor 810 is positioned along each seed line 109 (only one proximity sensor 810 is shown for clarity).

According to instructions received from the PLC 108, the drives 806 translate the pruning devices 804 in the direction of travel 119 along the beds 101 and impart an oscillating motion to the pruning devices 804 as the pruning devices 804 are translated. For example, the lateral drives 806 move (e.g., sweep) the lateral pruning devices 804 sinusoidally up and down between the base of the bed 101 and the top surface 105 of the bed 101 as the pruning devices 804 are translated along the side surfaces 107 of the bed 101. The combined translational and oscillating motion of the lateral pruning devices 804 covers substantially the entire area of the side surfaces 107 of the bed 101. The upper drive 806 moves (e.g., sweeps) the upper pruning device 804 sinusoidally from side to side between the plants 103 disposed along opposite seed lines 109 as the pruning device 804 is translated along the top surface 105 of the bed 101. The proximity sensors 810 detect the presence of plants 103 along the seed lines 109. The PLC 108 notes the locations of the plants 103 and controls the sweeping motion of upper pruning device 804 such that the upper pruning device 804 avoids contact with the detected plants 103. As a pruning device 804 is moved along the bed 101, the pruning device 804 utilizes suction to pull a runner 117 into the suction tube 166 and severs the runner 117 extending across teeth of the cutter 168 when the cutter 168 is positioned at a predetermined distance of about 1 cm to about 3 cm (e.g., about 2 cm) from the runner 117.

In some examples, air is drawn into the suction tube 166 at a volumetric flow rate of at least 8.5 m$^3$/min and at a speed of about 200 km/h to about 500 km/h (e.g., about 258 km/h). The volumetric flow rate of the air may vary as a function of the diameter of the suction tube 166 in order to achieve the desired air speed (e.g., about 258 km/h). The cutter 168 may rotate continuously around the suction tube 166 or oscillate back and forth along a portion of the suction tube 166, thereby causing the teeth of the cutter 168 to sever a runner 117 that is pulled up into the suction tube 166 and across the teeth of the cutter 168. The gate valves 124 are maintained in a closed state such that the suction tubes 166 remain 'on' during operation of the pruning system 800. The air delivery jets 174 positioned near opposite sides of the cutter 168 deliver air to the bed 101 to help lift the runner 117 up from the bed 101 so that the runner 117 can be captured by the vacuum generated within the suction tube 166.

Owing to the extensive coverage provided by the sweeping motion of the pruning devices 804, in some examples, about 75% to about 100% of the runners 117 extending from the plants 103 may be pruned from a bed 101 during a pruning operation carried out by the pruning system 800. In some examples, the pruning system 800 can achieve a runner pruning rate as fast as one runner every 2 seconds, such that the pruning system may prune up to 30 runners per minute. Accordingly, the pruning system 800 may be used to prune runners in a much faster manner than some conventional pruners, while avoiding damage to fruits within the plants.

In operation, the pruning system 800 may be steered by an operator as it travels along the beds 101 of plants 103. As the pruning system 800 travels in the field, communication is maintained over a network between the operator, the PLC 108, the wheel encoder 126 (e.g., to indicate a distance traveled by the pruning system 800), and the GPS system so that a status of the pruning system 800 can be monitored. Example monitored parameters include a system location and a system velocity (e.g., determined according to the angular velocity of the wheels). The operator may change the location and/or the velocity of the pruning system 800 by sending appropriate instructions over the network to the PLC 108 of the pruning system 800.

Figure 12:
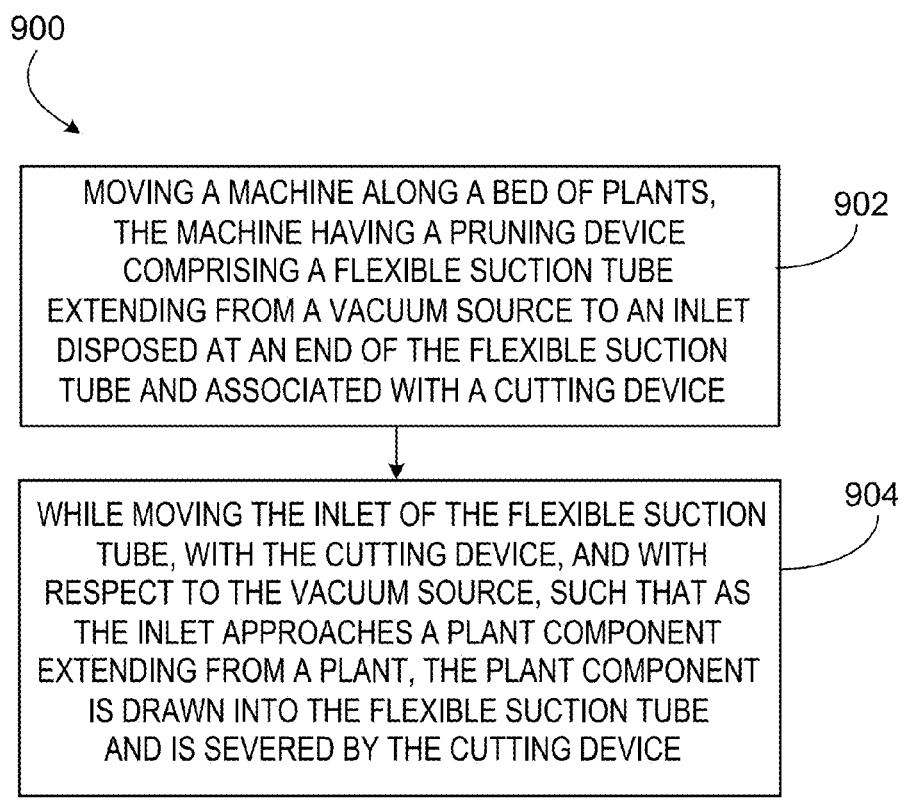
FIG. 12 is a flow chart of an example process for pruning plants.

FIG. 12 displays a flow chart of an example process 900 for pruning plants (e.g., strawberry plants) using the pruning system 800. A pruning system that has a pruning device including a flexible suction tube extending from a vacuum source to an inlet disposed at an end of the flexible suction tube and associated with a cutting device, is moved along a bed of plants (902). While moving the machine along the bed of plants, the inlet of the flexible suction tube is moved, with the cutting device, and with respect to the vacuum source, such that as the inlet approaches a runner extending from a plant, the runner is drawn into the flexible suction tube and is severed by the cutting device (904).

For example, a drive mounted to the pruning system carries the pruning device in a direction of travel along a top or side surface of the bed. While the pruning device is moved in the direction of travel, the pruning device is also moved sinusoidally (e.g., either from side to side between plants located along opposing seed lines or up and down between a top surface and base of the bed) such that the suction tube is moved with respect to the blower. In some examples, a proximity sensor located ahead of an upper pruning device detects proximity to the plants as the pruning device is moved. Runners encountered by the pruning devices are drawn into a suction tube of the pruning device, and the runners are severed from the plant along a cutter of the pruning device located at an end of the suction tube.

As the plants 103 grow larger and bear strawberries 115, vision capabilities (e.g., as embodied in the machine vision systems 120 of the pruning system 100 of FIG. 1) may be needed to avoid damaging the strawberries 115 and the plants 103 with the pruning devices. Accordingly, the pruning system 100 of FIG. 1 may be employed to prune the plants 103 at a mature or an appropriate growth state of the plants 103.

The pruning system 800 may be used to prune mature plants 103 along the side surfaces 107 of the beds 101 while the strawberries 115 remain undisturbed along the top surface 105 of the bed, since a majority (e.g., about 75%) of the runners 117 of mature plants 103 grow down the sides of the beds 101. The upper pruning assemblies 802 may be deactivated (e.g., the suction tubes 166 may be turned 'off') when the pruning system 800 is used to prune mature plants 103 to avoid damaging the plants 103, which grow close together at a mature phase.

While a number of examples have been described for illustration purposes, the foregoing description is not intended to limit the scope of the invention, which is defined by the scope of the appended claims. There are and will be other examples and modifications within the scope of the following claims.

What is claimed is:

1. A method of pruning plants, the method comprising:
generating a first series of images of a plant disposed along a planting bed using a camera mounted to a machine moving along the planting bed;
identifying a first object displayed in the first series of images as a fruit on or within the plant from first feature boundary data defined by first color regions associated with the images;
collecting data associated with a state of the fruit such that the collected data can be used to determine a schedule for harvesting fruits from the planting bed;
identifying a second object displayed in the first series of images as a suspect plant component of the plant from second feature boundary data defined by second color regions associated with the images;
comparing a parameter of the suspect plant component to a reference parameter associated with plant components to be pruned from the plant;
in response to determining that the parameter of the suspect plant component sufficiently matches the reference parameter, identifying the suspect plant component as a plant component to be pruned from the plant;
upon identifying the suspect plant component as a plant component to be pruned from the plant, advancing an automated pruner mounted to the machine toward the plant component based on a determined position of the plant component, and operating the automated pruner to sever the plant component from the plant as the machine continues to move along the planting bed; and
while the automated pruner is operated to sever the plant component, generating a second series of images of one or more additional plants disposed along the planting bed using the camera as the machine continues to move along the planting bed.

2. The method of claim 1, wherein the camera comprises a portion of a machine vision system that is operable to analyze the first and second series of images.

3. The method of claim 2, wherein the automated pruner is located rearward of the machine vision system, such that the camera generates the second series of images of the one or more additional plants while the automated pruner is operated to sever the plant component of the plant.

4. The method of claim 1, wherein identifying the suspect plant component as a plant component to be removed from the plant comprises identifying the suspect plant component as a runner.

5. The method of claim 1, wherein identifying the first object as a fruit comprises identifying the first object as a strawberry.

6. The method of claim 1, further comprising identifying the second object as a suspect plant component using a blob analysis.

7. The method of claim 6, wherein the blob analysis identifies regions of the second object that fall within a color range and determines a border around the regions that define the parameter of the second object.

8. The method of claim 7, wherein the parameter comprises a shape of the second object, and wherein identifying the second object as a suspect plant component comprises comparing the shape of the second object to a known shape of the plant component.

9. The method of claim 1, wherein the parameter comprises a size of the second object.

10. The method of claim 1, wherein the predetermined position of the suspect plant component is a two-dimensional location, and the method further comprises, before advancing the automated pruner toward the suspect plant component, aligning the automated pruner with the two-dimensional location of the suspect plant component.

11. The method of claim 1, further comprising:
monitoring a proximity sensor of the automated pruner to determine that the automated pruner is within a predetermined distance of an impediment;
detect a color of the impediment using a color sensor; and
confirming, based on the color of the impediment, that the impediment is a runner.

12. The method of claim 1, further comprising drawing the plant component into a suction tube of the automated pruner and severing the plant component from the plant using a cutter of the automated pruner.

13. The method of claim 12, wherein the cutter is an oscillating cutter that moves about the suction tube or a rotating cutter that sweeps through the suction tube.

14. The method of claim 1, further comprising lifting the plant component up from the planting bed by directing air toward the plant component using an air delivery jet.

15. The method of claim 1, further comprising moving the plant to expose hidden fruits and other hidden components on or within the plants and one or more additional plants while generating the first and second series of images.

16. The method of claim 1, wherein the collected data comprises one or more of a ripeness of the fruit, a location of the fruit, a size of the fruit, and a count associated with the fruit.

17. The method of claim 16, further comprising generating a field assessment report based on the collected data.

18. The method of claim 1, further comprising collecting additional data associated with the plant component, such that the additional data can be used to determine the schedule for harvesting the fruits from the planting bed.

19. The method of claim 1, wherein the machine has a pruning device comprising a flexible suction tube extending from a vacuum source to an inlet disposed at an end of the flexible suction tube and associated with a cutting device, wherein the method further comprises moving the inlet of the flexible suction tube, with the cutting device, with respect to the vacuum source, and while moving the machine along the bed of plants, such that as the inlet approaches the plant component extending from the plant, the plant component is drawn into the flexible suction tube and is severed by the cutting device.

20. A pruning system, comprising:
a machine configured to move along a planting bed;
a machine vision system mounted to the machine and configured to generate a first series images of a plant disposed along the planting bed as the machine moves along the planting bed;
one or more processors mounted to the machine and configured to:
identify a first object displayed in the first series of images as a fruit on or within the plant from first feature boundary data defined by first color regions associated with the images, collect data associated with a state of the fruit such that the data can be used to determine a schedule for harvesting fruits from the planting bed, identify a second object displayed in the first series of images as a suspect plant component of the plant from second feature boundary data defined by second color regions associated with the images, compare a parameter of the suspect plant component to a reference parameter associated with plant components to be pruned from the plant, and in response to determining that the parameter of the suspect plant component sufficiently matches the reference parameter, identify the suspect plant component as a plant component to be pruned from the plant;

an automated pruner mounted to the machine operable to sever the plant component from the plant; and a controller mounted to the machine configured to provide instructions for:

advancing the automated pruner toward the plant component based on a determined position of the plant component in response to identifying the suspect plant component as a plant component to be pruned from the plant, and operating the automated pruner to sever the plant component from the plant as the machine continues to move along the planting bed and while the machine vision system generates a second series of images of one or more additional plants disposed along the planting bed.

* * * * *